US012587303B2

(12) United States Patent
Xie et al.

(10) Patent No.: US 12,587,303 B2
(45) Date of Patent: Mar. 24, 2026

(54) COMMUNICATION METHOD AND APPARATUS

(71) Applicant: HUAWEI TECHNOLOGIES CO., LTD., Shenzhen (CN)

(72) Inventors: Xinqian Xie, Beijing (CN); Zhiheng Guo, Beijing (CN); Yubo Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 18/302,529

(22) Filed: Apr. 18, 2023

(65) Prior Publication Data

US 2023/0261780 A1     Aug. 17, 2023

Related U.S. Application Data

(63) Continuation of application No. PCT/CN2020/121979, filed on Oct. 19, 2020.

(51) Int. Cl.
*H04L 1/00*          (2006.01)
*H04W 72/23*         (2023.01)

(52) U.S. Cl.
CPC ........... *H04L 1/0003* (2013.01); *H04W 72/23* (2023.01)

(58) Field of Classification Search
CPC ... H04L 1/0003; H04L 1/0009; H04L 1/0016; H04L 1/0023; H04L 1/0026; H04W 72/23
USPC ........................................................ 375/361
See application file for complete search history.

(56) References Cited

U.S. PATENT DOCUMENTS

| | | | |
|---|---|---|---|
| 2019/0349975 A1 | 11/2019 | Nammi et al. |
| 2020/0022163 A1 | 1/2020 | Rico Alvarino et al. |
| 2020/0106550 A1 | 4/2020 | Yoshimoto et al. |

(Continued)

FOREIGN PATENT DOCUMENTS

| | | |
|---|---|---|
| CN | 103297181 A | 9/2013 |
| CN | 103518398 A | 1/2014 |
| CN | 110460409 A | 11/2019 |

(Continued)

OTHER PUBLICATIONS

3GPP TS 38.212 V16.3.0, "3rd Generation Partnership Project; Technical Specification Group Radio Access Network; NR; Multiplexing and channel coding (Release 16)," Sep. 2020, 152 pages.

(Continued)

*Primary Examiner* — Fitwi Y Hailegiorgis
(74) *Attorney, Agent, or Firm* — Fish & Richardson P.C.

(57)          ABSTRACT

This application provides communication methods and apparatuses. An example method includes: receiving first indication information, wherein the first indication information indicates a first modulation coding scheme; and determining, from a first modulation coding scheme set, a first modulation coding scheme indicated by the first indication information. The first modulation coding scheme set comprises modulation coding schemes whose modulation orders are respectively 2, 4, 6, 8 and 10. A quantity of modulation coding schemes whose modulation order is 10 is 4. Coding rates corresponding to 2 of the 4 modulation coding schemes whose modulation orders are 10 comprise 853/1024 and 948/1024.

20 Claims, 4 Drawing Sheets

(56)                    References Cited

U.S. PATENT DOCUMENTS

2023/0198702 A1*   6/2023   Kim .................... H04L 27/2601
                                                               370/329

FOREIGN PATENT DOCUMENTS

| CN | 110771202 A | 2/2020 |
| JP | 2019004212 A | 1/2019 |
| WO | 2019019174 A1 | 1/2019 |

OTHER PUBLICATIONS

3GPP TS 38.214 V16.3.0, "3rd Generation Partnership Project; Technical Specification Group Radio Access Network; NR; Physical layer procedures for data (Release 16)," Sep. 2020, 166 pages.

International Search Report and Written Opinion in International Appln. No. PCT/CN2020/121979, mailed on Jul. 15, 2021, 14 pages (with English translation).
NTT Docomo, Inc., "Remaining issues on resource allocation mechanism mode 1," 3GPP TSG RAN WG1 #101, R1-2004384, e-Meeting, May 25-Jun. 5, 2020, 12 pages.
Office Action in Japanese Appln. No. 2023-523547, mailed on Jun. 11, 2024, 8 pages (with English translation).
Intel Corporation, "On 1024QAM support," 3GPP TSG RAN WG1 Meeting 90bis, R1-1717337, Prague, CZ, Oct. 9-13, 2017, 5 pages.
Huawei et al., "Discussion and simulation results on 1024QAM DL CSI requirements," 3GPP TSG-RAN WG4 Meeting #86bis, R4-1805285, Melbourne, Australia, Apr. 16-20, 2018, 4 pages.
Extended European Search Report in European Appln No. 20957969. 7, dated Oct. 20, 2023, 11 pages.
Office Action in Korean Appln. No. 2023-7016772, mailed on Feb. 19, 2025, 10 pages (with English translation).

* cited by examiner

COMMUNICATION METHOD AND APPARATUS

CROSS-REFERENCE TO RELATED APPLICATIONS

This application is a continuation of International Application No. PCT/CN2020/121979, filed on Oct. 19, 2020, the disclosure of which is hereby incorporated by reference in its entirety.

TECHNICAL FIELD

This application relates to the field of wireless communication, and in particular, to a communication method and apparatus in a wireless communication system.

BACKGROUND

In a wireless communication system, a base station communicates with a terminal through a wireless link. A channel state of the wireless link is affected by factors such as a distance and/or an environment between the base station and the terminal. For example, the channel state may be different for different distances. In a case, when the distance between the base station and the terminal is short and there are fewer obstacles between the terminal and the base station, channel quality between the base station and the terminal is good; and when the distance between the base station and the terminal is long and there are more obstacles, channel quality between the base station and the terminal is poor.

To meet communication quality of different terminals in a network, a new radio interface (New radio interface, NR) system of a 5th generation (5th Generation, 5G) mobile communication system supports a plurality of modulation coding schemes (Modulation Coding Scheme, MCS), and different MCSs correspond to different modulation orders and/or coding rates. At a specific coding rate, a higher modulation order indicates higher spectral efficiency of communication. Therefore, for a terminal with better channel quality, the base station usually performs signal transmission using a modulation scheme with a higher modulation order, to obtain a higher communication rate.

Currently, a maximum modulation order supported by a data channel in the NR system is 8. This limits a communication rate of a terminal with good channel quality in a network central area.

SUMMARY

The present invention provides a communication method and apparatus, to improve communication efficiency.

According to a first aspect, this application provides a communication method. The method may be performed by a terminal device, or may be performed by a chip applied to a terminal device. The following provides descriptions by using an example in which the method is performed by the terminal device. The terminal device receives first indication information from a network device, where the first indication information indicates a first modulation coding scheme. The terminal device determines a first modulation coding scheme from a first modulation coding scheme set based on the first modulation coding scheme indicated by the indication information. The first modulation coding scheme includes a first modulation order and a first coding rate, and the first modulation coding scheme set includes at least one modulation coding scheme whose modulation order is 10.

In the foregoing manner, when the terminal device communicates with the network device, the first modulation coding scheme set includes a modulation coding scheme whose modulation order is 10. When the terminal device is located in a network central area or another area with good channel quality, the modulation coding scheme whose modulation order is 10 may be selected from the first modulation coding scheme set for communication. A higher modulation order indicates that more content is carried on a same resource, that is, spectral efficiency of communication is higher, thereby improving the communication efficiency.

A modulation scheme corresponding to the modulation coding scheme whose modulation order is 10 is 1024QAM. Similarly, a modulation order corresponding to the modulation coding scheme whose modulation scheme is 1024QAM is 10.

In an optional manner, a quantity of the at least one modulation coding scheme whose modulation order is 10 included in the first modulation coding scheme set is not less than a quarter of a total quantity of modulation coding schemes included in the first modulation coding scheme set.

In an optional manner, the first modulation coding scheme set further includes at least one modulation coding scheme whose modulation order is 8, and the quantity of the at least one modulation coding scheme whose modulation order is 10 is not less than a quantity of the at least one modulation coding scheme whose modulation order is 8.

In an optional manner, the first modulation coding scheme set further includes at least one modulation coding scheme whose modulation order is 8, and a sum of the quantity of the at least one modulation coding scheme whose modulation order is 10 and the quantity of the at least one modulation coding scheme whose modulation order is 8 is not less than a half of the total quantity of modulation coding schemes included in the first modulation coding scheme set.

In the foregoing manner, it can be ensured that a quantity of modulation coding schemes with higher modulation orders in the first modulation coding scheme set is not excessively small, to ensure that the terminal device has a plurality of modulation coding schemes whose modulation orders are 10 for selection when channel quality is good.

In an optional manner, for the first modulation coding scheme set, the quantity of the at least one modulation coding scheme whose modulation order is 10 is 8, 4, 3, or 6.

In an optional manner, the quantity of the at least one modulation coding scheme whose modulation order is 10 is 4, and coding rates corresponding to the four modulation coding schemes whose modulation orders are 10 are respectively 806/1024, 853/1024, 900/1024, and 948/1024.

In an optional manner, the quantity of the at least one modulation coding scheme whose modulation order is 10 is 3, and coding rates corresponding to the three modulation coding schemes whose modulation orders are 10 are respectively 806/1024, 876/1024, and 948/1024.

In an optional manner, the quantity of the at least one modulation coding scheme whose modulation order is 10 is 8, and coding rates corresponding to the eight modulation coding schemes whose modulation orders are 10 are respectively 782/1024, 806/1024, 829/1024, 853/1024, 877/1024, 900/1024, 924/1024, and 948/1024.

In an optional manner, the quantity of the at least one modulation coding scheme whose modulation order is 10 is 6, and coding rates corresponding to the six modulation coding schemes whose modulation orders are 10 are respectively 790/1024, 822/1024, 853/1024, 885/1024, 916/1024, and 948/1024.

In the foregoing manner, spectrum intervals of coding rates corresponding to modulation coding schemes whose modulation orders are 10 in the first modulation coding scheme set are more even, which improves precision of selecting a modulation coding scheme by the network device.

In an optional manner, the first indication information is carried in downlink control information DCI, or the first indication information is carried in radio resource control RRC signaling, or the first indication information carries a Media Access Control control element MAC CE.

In an optional manner, after the terminal device determines, from the first modulation coding scheme set, a first modulation coding scheme corresponding to the first indication information, the terminal device processes, based on the first modulation coding scheme, a first signal received from the network device, or the terminal device sends a first signal to the network device based on the first modulation coding scheme.

Correspondingly, the network device processes, based on the first modulation coding scheme, a first signal received from the terminal device, or the network device sends a first signal to the terminal device based on the first modulation coding scheme.

In an optional manner, the first indication information further indicates a resource of a physical downlink shared channel PDSCH or a physical uplink shared channel PUSCH while indicating the first modulation coding scheme.

The first signal in the foregoing optional manners is a PUSCH or a PDSCH. Certainly, the first signal may alternatively be another signal.

In an optional manner, before the terminal device receives the first indication information from the network device, the terminal device sends second indication information to the network device. The second indication information indicates a first channel quality information CQI index, the first CQI index corresponds to a second modulation coding scheme, the second modulation coding scheme includes a second modulation order and a second coding rate, the second modulation coding scheme is one of a second modulation coding scheme set, and the second modulation coding scheme set includes at least one modulation coding scheme whose modulation order is 10.

In the foregoing manner, when the terminal device sends channel quality information to the network device, if the terminal device is located in an area with a good channel state, a modulation coding scheme whose modulation order is 10 may be used. A higher modulation order indicates a higher coding rate, and fewer redundant bits are increased during communication, and therefore, the communication efficiency is also higher.

In an optional manner, a quantity of modulation coding schemes whose modulation orders are 10 included in the second modulation coding scheme set is equal to a quantity of modulation coding schemes whose modulation orders are 10 included in the first modulation coding scheme set.

In an optional manner, coding rates of the modulation coding schemes whose modulation orders are 10 included in the second modulation coding scheme set are equal to coding rates of the modulation coding schemes whose modulation orders are 10 included in the first modulation coding scheme set.

According to a second aspect, this application provides a communication method. The method may be performed by a network device, or may be performed by a chip applied to a network device. The following provides descriptions by using an example in which the method is performed by the network device. The network device determines a first modulation coding scheme index in a first modulation coding scheme set, and sends the first modulation coding scheme index to a terminal device. The first modulation coding scheme index corresponds to a first modulation coding scheme, the first modulation coding scheme includes a first modulation order and a first coding rate, and the first modulation coding scheme set includes at least one modulation coding scheme whose modulation order is 10.

In the foregoing manner, when the terminal device communicates with the network device, the first modulation coding scheme set includes a modulation coding scheme whose modulation order is 10. When the terminal device is located in a network central area or another area with good channel quality, the modulation coding scheme whose modulation order is 10 may be selected from the first modulation coding scheme set for communication, thereby improving the communication efficiency.

For detailed descriptions of the first modulation coding scheme, the first modulation coding scheme set, the first indication information, and the modulation coding scheme whose modulation order is 10 in the second aspect, refer to related descriptions in the first aspect. Details are not described herein again.

In an optional manner, after the network device sends the first modulation coding scheme index to the terminal device, the network device processes a received first signal based on the first modulation coding scheme; or after the network device sends the first modulation coding scheme index to the terminal device, the network device sends a first signal to the terminal device based on the first modulation coding scheme.

In an optional manner, before the network device sends the first indication information to the terminal device, the network device receives second indication information from the terminal device. The second indication information indicates a first channel quality information CQI index, the first CQI index corresponds to a second modulation coding scheme, the second modulation coding scheme includes a second modulation order and a second coding rate, the second modulation coding scheme is one of a second modulation coding scheme set, and the second modulation coding scheme set includes at least one modulation coding scheme whose modulation order is 10.

In the foregoing manner, when the terminal device sends channel quality information to the network device, if the terminal device is located in an area with a good channel state, a modulation coding scheme whose modulation order is 10 may be used, thereby improving the communication efficiency.

In an optional manner, a quantity of modulation coding schemes whose modulation orders are 10 included in the second modulation coding scheme set is equal to a quantity of modulation coding schemes whose modulation orders are 10 included in the first modulation coding scheme set.

In an optional manner, coding rates of the modulation coding schemes whose modulation orders are 10 included in the second modulation coding scheme set are equal to coding rates of the modulation coding schemes whose modulation orders are 10 included in the first modulation coding scheme set.

For technical effects of the second aspect or the corresponding implementations, refer to the descriptions of the technical effects of the first aspect or the corresponding implementations.

According to a third aspect, this application provides another communication method. The method may be performed by a terminal device, or may be performed by a chip applied to a terminal device. The following provides descriptions by using an example in which the method is performed by the terminal device. The terminal device determines first channel quality information CQI, and the terminal device sends second indication information to a network device. The second indication information indicates a first CQI index corresponding to the first CQI, the first CQI index corresponds to a second modulation coding scheme, the second modulation coding scheme includes a second modulation order and a second coding rate, the second modulation coding scheme is one of a second modulation coding scheme set, and the second modulation coding scheme set includes at least one modulation coding scheme whose modulation order is 10.

In the foregoing manner, when the terminal device sends channel quality information to the network device, if the terminal device is located in an area with a good channel state, a modulation coding scheme whose modulation order is 10 may be used, thereby improving the communication efficiency.

In an optional manner, a quantity of the at least one modulation coding scheme whose modulation order is 10 included in the first modulation coding scheme set is not less than a quarter of a total quantity of modulation coding schemes included in the first modulation coding scheme set.

In an optional manner, the first modulation coding scheme set further includes at least one modulation coding scheme whose modulation order is 8, and the quantity of the at least one modulation coding scheme whose modulation order is 10 is not less than a quantity of the at least one modulation coding scheme whose modulation order is 8.

In an optional manner, the first modulation coding scheme set further includes at least one modulation coding scheme whose modulation order is 8, and a sum of the quantity of the at least one modulation coding scheme whose modulation order is 10 and the quantity of the at least one modulation coding scheme whose modulation order is 8 is not less than a half of the total quantity of modulation coding schemes included in the first modulation coding scheme set.

In the foregoing manner, it can be ensured that a quantity of modulation coding schemes with higher modulation orders in the second modulation coding scheme set is not excessively small, to ensure that the terminal device has a plurality of modulation coding schemes whose modulation orders are 10 for selection when channel quality is good.

In an optional manner, for the first modulation coding scheme set, the quantity of the at least one modulation coding scheme whose modulation order is 10 is 4 or 2.

In an optional manner, the quantity of the at least one modulation coding scheme whose modulation order is 10 is 4, and coding rates corresponding to the four modulation coding schemes whose modulation orders are 10 are respectively 806/1024, 853/1024, 900/1024, and 948/1024, or coding rates corresponding to the four modulation coding schemes whose modulation orders are 10 are respectively 790/1024, 822/1024, 885/1024, and 948/1024; or the quantity of the at least one modulation coding scheme whose modulation order is 10 is 2, and coding rates corresponding to the two modulation coding schemes whose modulation orders are 10 are respectively 853/1024 and 948/1024.

According to a fourth aspect, this application provides a communication method. The method may be performed by a network device, or may be performed by a chip applied to a network device. The following provides descriptions by using an example in which the method is performed by the network device. The network device receives a first channel quality information CQI index from a terminal device, and the terminal device determines, from a second modulation coding scheme set, a second modulation coding scheme corresponding to the first CQI index. The second modulation coding scheme includes a second modulation order and a second coding rate, and the second modulation coding scheme set includes at least one modulation coding scheme whose modulation order is 10.

For detailed descriptions of the second modulation coding scheme, the second modulation coding scheme set, the second indication information, and the modulation coding scheme whose modulation order is 10 in the fourth aspect, refer to related descriptions in the third aspect. Details are not described herein again.

For technical effects of the fourth aspect or the corresponding implementations, refer to the descriptions of the technical effects of the third aspect or the corresponding implementations.

According to a fifth aspect, a communication apparatus is provided. The communication apparatus has a function of implementing behaviors in the method example according to the first aspect. The function may be implemented by hardware, or may be implemented by hardware executing corresponding software. The hardware or the software includes one or more modules corresponding to the foregoing function. In a possible design, the communication apparatus includes a receiving unit and a processing unit. The receiving unit is configured to receive first indication information from a network device, where the first indication information indicates a first modulation coding scheme. The processing unit is configured to determine, from a first modulation coding scheme set, a first modulation coding scheme corresponding to the first indication information, where first modulation coding scheme includes a first modulation order and a first coding rate, and the first modulation coding scheme set includes at least one modulation coding scheme whose modulation order is 10.

For detailed descriptions of the first modulation coding scheme, the first modulation coding scheme set, the first indication information, and the modulation coding scheme whose modulation order is 10 in the fifth aspect, refer to related descriptions in the first aspect. Details are not described herein again.

In an optional manner, the communication apparatus further includes a sending unit. The sending unit sends second indication information before the receiving unit receives the first indication information. The second indication information indicates a first channel quality information CQI index, the first CQI index corresponds to a second modulation coding scheme, the second modulation coding scheme includes a second modulation order and a second coding rate, the second modulation coding scheme is one of a second modulation coding scheme set, and the second modulation coding scheme set includes at least one modulation coding scheme whose modulation order is 10.

In the foregoing manner, when the terminal device sends channel quality information to the network device, if the terminal device is located in an area with a good channel state, a modulation coding scheme whose modulation order is 10 may be used, thereby improving the communication efficiency.

In an optional manner, a quantity of modulation coding schemes whose modulation orders are 10 included in the second modulation coding scheme set is equal to a quantity of modulation coding schemes whose modulation orders are 10 included in the first modulation coding scheme set.

In an optional manner, coding rates of the modulation coding schemes whose modulation orders are 10 included in the second modulation coding scheme set are equal to coding rates of the modulation coding schemes whose modulation orders are 10 included in the first modulation coding scheme set.

For technical effects of the fifth aspect or the corresponding implementations, refer to the descriptions of the technical effects of the first aspect or the corresponding implementations.

According to a sixth aspect, a communication apparatus is provided. The communication apparatus has a function of implementing behaviors in the method example according to the first aspect. The function may be implemented by using hardware or may be implemented by using hardware executing corresponding software. The hardware or the software includes one or more modules corresponding to the foregoing function. In a possible design, the communication apparatus includes a processing unit and a sending unit. The processing unit is configured to determine a first modulation coding scheme index in a first modulation coding scheme set. The sending unit is configured to send the first modulation coding scheme index. The first modulation coding scheme index corresponds to a first modulation coding scheme, the first modulation coding scheme includes a first modulation order and a first coding rate, and the first modulation coding scheme set includes at least one modulation coding scheme whose modulation order is 10.

For detailed descriptions of the first modulation coding scheme, the first modulation coding scheme set, the first indication information, and the modulation coding scheme whose modulation order is 10 in the sixth aspect, refer to related descriptions in the second aspect. Details are not described herein again.

In an optional manner, the communication apparatus further includes a receiving unit. The receiving unit receives second indication information before the first indication information is sent. The second indication information indicates a first channel quality information CQI index, the first CQI index corresponds to a second modulation coding scheme, the second modulation coding scheme includes a second modulation order and a second coding rate, the second modulation coding scheme is one of a second modulation coding scheme set, and the second modulation coding scheme set includes at least one modulation coding scheme whose modulation order is 10.

In the foregoing manner, when the terminal device sends channel quality information to the network device, if the terminal device is located in an area with a good channel state, a modulation coding scheme whose modulation order is 10 may be used, thereby improving the communication efficiency.

In an optional manner, a quantity of modulation coding schemes whose modulation orders are 10 included in the second modulation coding scheme set is equal to a quantity of modulation coding schemes whose modulation orders are 10 included in the first modulation coding scheme set.

In an optional manner, coding rates of the modulation coding schemes whose modulation orders are 10 included in the second modulation coding scheme set are equal to coding rates of the modulation coding schemes whose modulation orders are 10 included in the first modulation coding scheme set.

For technical effects of the sixth aspect or the corresponding implementations, refer to the descriptions of the technical effects of the second aspect or the corresponding implementations.

According to a seventh aspect, a communication apparatus is provided. The communication apparatus has a function of implementing behaviors in the method example according to the first aspect. The function may be implemented by using hardware or may be implemented by using hardware executing corresponding software. The hardware or the software includes one or more modules corresponding to the foregoing function. In a possible design, the communication apparatus includes a processing unit and a sending unit. The processing unit is configured to determine first channel quality information CQI. The sending unit is configured to send second indication information. The second indication information indicates a first CQI index corresponding to the first CQI, the first CQI index corresponds to a second modulation coding scheme, the second modulation coding scheme includes a second modulation order and a second coding rate, the second modulation coding scheme is one of a second modulation coding scheme set, and the second modulation coding scheme set includes at least one modulation coding scheme whose modulation order is 10.

For detailed descriptions of the second modulation coding scheme, the second modulation coding scheme set, the second indication information, and the modulation coding scheme whose modulation order is 10 in the seventh aspect, refer to related descriptions in the third aspect. Details are not described herein again.

For technical effects of the seventh aspect or the corresponding implementations, refer to the descriptions of the technical effects of the third aspect or the corresponding implementations.

According to an eighth aspect, a communication apparatus is provided. The communication apparatus has a function of implementing behaviors in the method example according to the first aspect. The function may be implemented by using hardware or may be implemented by using hardware executing corresponding software. The hardware or the software includes one or more modules corresponding to the foregoing function. In a possible design, the communication apparatus includes a receiving unit and a processing unit. The receiving unit is configured to receive first channel quality information CQI index. The processing unit is configured to determine, from a second modulation coding scheme set, a second modulation coding scheme corresponding to the first CQI index. The second modulation coding scheme includes a second modulation order and a second coding rate, and the second modulation coding scheme set includes at least one modulation coding scheme whose modulation order is 10.

For detailed descriptions of the second modulation coding scheme, the second modulation coding scheme set, the second indication information, and the modulation coding scheme whose modulation order is 10 in the eighth aspect, refer to related descriptions in the fourth aspect. Details are not described herein again.

For technical effects of the eighth aspect or the corresponding implementations, refer to the descriptions of the technical effects of the fourth aspect or the corresponding implementations.

According to a ninth aspect, a communication apparatus is provided. The communication apparatus may be the terminal device in the foregoing method embodiments, or may be a chip disposed in the terminal device. The communication apparatus includes a processor and a memory.

The memory is configured to store at least one computer program or instruction, and when the one or more computer programs are run, the communication apparatus is enabled to perform the method performed by the terminal device in the foregoing method embodiments.

According to a tenth aspect, a communication apparatus is provided. The communication apparatus may be the network device in the foregoing method embodiments, or may be a chip disposed in the network device. The communication apparatus includes a processor and a memory. The memory is configured to store at least one computer program or instruction, and when the one or more computer programs are run, the communication apparatus is enabled to perform the method performed by the network device in the foregoing method embodiments.

According to an eleventh aspect, a computer-readable storage medium is provided, and is configured to store a computer program. When the computer program is run, the method performed by the terminal device in the foregoing aspects are performed.

According to a twelfth aspect, a computer-readable storage medium is provided, and is configured to store a computer program. When the computer program is run, the method performed by the network device in the foregoing aspects are performed.

According to a thirteenth aspect, this application provides a chip system. The chip system includes a processor, configured to implement functions of the terminal device in the methods in the foregoing aspects. In a possible design, the chip system further includes a memory, configured to store program instructions and/or data. The chip system may include a chip, or may include a chip and another discrete component.

According to a fourteenth aspect, this application provides a chip system. The chip system includes a processor, configured to implement functions of the network device in the methods in the foregoing aspects. In a possible design, the chip system further includes a memory, configured to store program instructions and/or data. The chip system may include a chip, or may include a chip and another discrete component.

According to a fifteenth aspect, a communication system is provided. The communication system includes the network device and the terminal device in any one of the foregoing aspects.

DESCRIPTION OF EMBODIMENTS

Technical solutions in embodiments of this application may be applied to various communication systems, for example, a long term evolution (long term evolution, LTE) system, a 5th generation (5th generation, 5G) mobile communication system, and a future mobile communication system.

Figure 1:
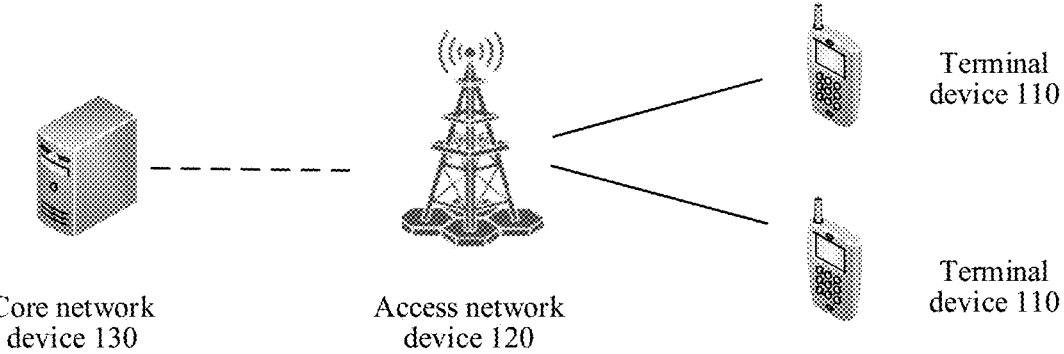
FIG. 1 is a schematic diagram of a possible communication architecture according to an embodiment of this application.

FIG. 1 is a schematic diagram of a possible network architecture to which an embodiment of this application is applicable. The network architecture includes a terminal device 110 and an access network device 120. Optionally, the network architecture may further include a core network device 130. The terminal device 110 and the access network device 120 may communicate with each other through a Uu air interface. The Uu air interface may be understood as a universal UE to network interface (universal UE to network interface). Transmission through the Uu air interface includes uplink transmission and downlink transmission.

In an LTE system, an access network device is an eNB, and a core network device is an MME. In a UMTS system, an access network device is an RNC, and a core network device is an SGSN. In another wireless communication system, a corresponding access network device and a corresponding core network device are also included. In the following embodiments, both the access network device and the core network device are referred to as network devices relative to the terminal device.

Based on the foregoing communication system, this application provides a communication method. The following explains and describes some terms used in this application, and the terms are also used as a part of the present invention.

1. Terminal Device

The terminal device may be briefly referred to as a terminal, or referred to as user equipment (user equipment, UE), which is a device having a wireless transceiver function. The terminal device may be deployed on land, where the deployment includes indoor or outdoor, or handheld or vehicle-mounted deployment, may be deployed on water (for example, on a ship), or may be deployed in air (for example, on aircraft, an unmanned aerial vehicle, a balloon, or a satellite). The terminal device may be a mobile phone, a vehicle, a tablet computer, a smart speaker, a detector, a gas station sensor, a computer with a wireless transceiver function, a virtual reality terminal device, an augmented reality terminal device, a wireless terminal device in industrial control, a wireless terminal device in unmanned driving, a wireless terminal device in telemedicine, a wireless terminal device in a smart grid, a wireless terminal device in transportation security, a wireless terminal device in a smart city, a wireless terminal device in a smart home, or the like. The terminal device may be fixed or mobile. This is not limited in embodiments of this application.

In embodiments of this application, an apparatus configured to implement a function of the terminal may be a terminal device, or may be an apparatus, for example, a chip system, that can support the terminal device in implementing the function. The apparatus may be installed in the terminal device. In embodiments of this application, the chip system may include a chip, or may include a chip and another discrete component. The technical solutions provided in embodiments of this application are described by using an example in which the apparatus configured to implement the function of the terminal device is the terminal device.

2. Network Device

The network device may be an access network device. The access network device may also be referred to as a radio access network (radio access network, RAN) device, and is a device that provides a wireless communication function for the terminal device. The access network device includes, for example, but is not limited to, a next generation NodeB (generation NodeB, gNB), an evolved NodeB (evolved NodeB, eNB), a baseband unit (baseband unit, BBU), a transmitting and receiving point (transmitting and receiving point, TRP), a transmitting point (transmitting point, TP) in 5G, a base station in a future mobile communication system, or an access point in a Wi-Fi system. Alternatively, the access network device may be a radio controller, a central unit (central unit, CU), and/or a distributed unit (distributed unit, DU) in a cloud radio access network (cloud radio access network, CRAN) scenario, or the network device may be a relay station, a vehicle-mounted device, a network device in a future evolved PLMN network, or the like.

The terminal device may communicate with a plurality of access network devices of different technologies. For example, the terminal device may communicate with an access network device supporting long term evolution (long term evolution, LTE), may communicate with an access network device supporting 5G, or may communicate with both an access network device supporting LTE and an access network device supporting 5G. This is not limited in embodiments of this application.

In embodiments of this application, an apparatus configured to implement a function of the network device may be a network device, or may be an apparatus, for example, a chip system, that can support the network device in implementing the functions. The apparatus may be installed in the network device. The technical solutions provided in embodiments of this application are described by using an example in which the apparatus configured to implement the function of the network device is the network device.

3. Modulation Coding Scheme (Modulation Coding Scheme, MCS)

An NR system supports a plurality of modulation coding schemes. On a dimension of technical types, modulation includes quadrature phase shift keying (Quadrature Phase Shift Keying, QPSK) modulation and quadrature amplitude modulation (Quadrature Amplitude Modulation, QAM). The QAM may include modulation schemes such as 16QAM, 64QAM, and 256QAM based on different modulation orders. For a terminal device with good channel quality, the network device usually sends a downlink signal to the terminal device by using a high-order modulation scheme, for example, 256QAM or 64QAM, or the terminal device sends an uplink signal by using a high-order modulation scheme, to obtain a higher communication rate. For a terminal device with poor channel quality, the network device sends a downlink signal to the terminal device by using a low-order modulation scheme, for example, QPSK or 16QAM, to ensure communication reliability. In addition to the modulation order, the MCS further includes a coding rate. The coding rate is usually expressed as a decimal or fraction greater than 0 and less than or equal to 1, for example, $\frac{1}{2}$ or $\frac{2}{3}$. A lower coding rate indicates that more redundant bits are added, the communication reliability is higher, but communication efficiency is lower. Therefore, for the terminal device with good channel quality, the network device usually uses a high coding rate, to maintain high communication efficiency. For the terminal device with poor channel quality, the network device uses a low coding rate, to ensure high communication reliability.

In embodiments of the present invention, to improve the communication efficiency, a new modulation coding scheme set is provided. The modulation coding scheme set includes one or more 1024QAM schemes.

NR rate matching is implemented based on an MCS index value. Different state values of an N-bit indication field represent different MCS indexes. Each MCS index value corresponds to a group of a modulation orders and a coding rate. In addition, each MCS index value further corresponds to one spectral efficiency. In other words, each MCS index value corresponds to a group of a modulation order, a coding rate, and a spectral efficiency. For example, the N-bit indication field corresponds to $2^N$ state values, and may correspond to $2^N$ modulation coding schemes. In other words, each state value may correspond to one modulation coding scheme, or may correspond to less than $2^N$ modulation coding schemes, that is, some state values are reserved, and do not indicate any modulation coding scheme.

Based on the foregoing new modulation coding scheme set (referred to as a first modulation coding scheme set in this embodiment), an MCS index table that can indicate including 1024QAM is designed in embodiments of the present invention. Each MCS index corresponds to one modulation coding scheme in the modulation coding scheme set, and each modulation coding scheme in the modulation coding scheme set includes a combination of a modulation order and a coding rate.

In a first optional manner, a quantity of modulation coding schemes whose modulation orders are 10 in the first modulation coding scheme set is not less than a quarter of a total quantity of all modulation coding schemes in the first modulation coding scheme set.

In a second optional manner, a quantity of modulation coding schemes whose modulation orders are 10 in the first modulation coding scheme set is not less than a quantity of modulation coding schemes whose modulation orders are 8 in the first modulation coding scheme set.

In a third optional manner, a sum of a quantity of modulation coding schemes whose modulation orders are 10 and a quantity of modulation coding schemes whose modulation orders are 8 in the first modulation coding scheme set is not less than a half of a total quantity of all modulation coding schemes in the first modulation coding scheme set.

The foregoing optional manners may be randomly combined, or may be separately used. For example, the first modulation coding scheme set in this embodiment meets both the first optional manner and the second optional manner. Certainly, the first modulation coding scheme set may alternatively meet all the three optional manners.

For example, for the first modulation coding scheme set, the quantity of modulation coding schemes whose modulation orders are 10 is not less than a quarter of the total quantity of all modulation coding schemes, and the quantity of modulation coding schemes whose modulation orders are 10 is not less than the quantity of modulation coding schemes whose modulation orders are 8. In another example, for the first modulation coding scheme set, the quantity of modulation coding schemes whose modulation orders are 10 is not less than the quantity of modulation coding schemes whose modulation orders are 8, and the sum of the quantity of modulation coding schemes whose modulation orders are 10 and the quantity of modulation coding schemes whose modulation orders are 8 is not less than a half of the total quantity of all modulation coding schemes in the first modulation coding scheme set. In another example, for the first modulation coding scheme set, the quantity of modulation coding schemes whose modulation orders are 10 is not less than a quarter of the total quantity of all modulation coding schemes, the quantity of modulation coding schemes whose modulation orders are 10 is not less than the quantity of modulation coding schemes whose modulation orders are 8 in the first modulation coding scheme set, and the sum of the quantity of modulation coding schemes whose modulation orders are 10 and the quantity of modulation coding schemes whose modulation orders are 8 is not less than a half of the total quantity of all modulation coding schemes in the first modulation coding scheme set.

Optionally, a quantity of at least one modulation coding scheme whose modulation order is 10 included in the first modulation coding scheme set may be 4, 3, 8, or 6.

Further, when the quantity of the at least one modulation coding scheme whose modulation order is 10 is 4, coding rates corresponding to the four modulation coding schemes whose modulation orders are 10 may respectively be 806/1024, 853/1024, 900/1024, and 948/1024.

Alternatively, when the quantity of the at least one modulation coding scheme whose modulation order is 10 is 3, coding rates corresponding to the three modulation coding schemes whose modulation orders are 10 may respectively be 806/1024, 876/1024, and 948/1024.

Alternatively, when the quantity of the at least one modulation coding scheme whose modulation order is 10 is 8, coding rates corresponding to the eight modulation coding schemes whose modulation orders are 10 may respectively be 782/1024, 806/1024, 829/1024, 853/1024, 877/1024, 900/1024, 924/1024, and 948/1024.

Alternatively, when the quantity of the at least one modulation coding scheme whose modulation order is 10 is 6, coding rates corresponding to the six modulation coding schemes whose modulation orders are 10 may respectively be 790/1024, 822/1024, 853/1024, 885/1024, 916/1024, and 948/1024.

The coding rate is usually expressed as a real number greater than zero and less than 1. The coding rate, for example, 790/1024, is expressed as a fraction. Alternatively, the coding rate may further be expressed as a fraction or a decimal.

Since each modulation coding scheme corresponds to one modulation order and one coding rate, such a correspondence is usually represented by using an MCS index table. Each modulation coding scheme is represented by using an MCS index value, and each modulation coding scheme corresponds to one MCS index value and corresponds to a group of a modulation order and a coding rate. In addition, each modulation coding scheme may further correspond to one spectral efficiency.

In the MCS index table, different index values may indicate modulation coding schemes whose modulation orders are 2, 4, 6, 8, or 10, or may be in a reserved state without any indication of a modulation order, a coding rate, and/or a spectral efficiency. It should be noted that, the first modulation coding scheme set includes an MCS corresponding to all or some indexes that can represent both a modulation order and a coding rate in the MCS index table corresponding to the modulation coding scheme.

Embodiments of the present invention further provide the following several examples of MCS index tables including 1024QAM. In an actual system, one or more examples of MCS index tables may be used, or some items of an MCS index table may be used, or a combination of some items of at least two MCS index tables may be used.

Table 1-1 shows a possible example of an MCS index table corresponding to the first modulation coding scheme set.

TABLE 1-1

| MCS index IMCS | Modulation order Qm | Coding rate × [1024] R × [1024] | Spectral efficiency |
|---|---|---|---|
| 0 | 2 | 120 | 0.2344 |
| 1 | 2 | 308 | 0.6016 |
| 2 | 2 | 602 | 1.1758 |
| 3 | 4 | 378 | 1.4766 |
| 4 | 4 | 434 | 1.6953 |
| 5 | 4 | 55 | 2.1602 |
| 6 | 4 | 616 | 2.4063 |
| 7 | 4 | 658 | 2.5703 |
| 8 | 6 | 517 | 3.0293 |
| 9 | 6 | 567 | 3.3223 |
| 10 | 6 | 616 | 3.6094 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 806 | 7.8692 |
| 24 | 10 | 853 | 8.3321 |
| 25 | 10 | 900 | 8.7949 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

In Table 1-1, each of MCS index values 0-26 corresponds to a modulation coding scheme. Since each of MCS index values 27-31 represents only a modulation order and corresponds to no coding rate, the first modulation coding scheme set shown in Table 1-1 includes 27 modulation coding schemes corresponding to the MCS index values 0-26. Based on Table 1-1, the first modulation coding scheme set has one or more of the following features:

(1) The first modulation coding scheme set includes three modulation coding schemes whose modulation orders are 2.

(2) The first modulation coding scheme set includes five modulation coding schemes whose modulation orders are 4.

(3) The first modulation coding scheme set includes seven modulation coding schemes whose modulation orders are 6.

(4) The first modulation coding scheme set includes eight modulation coding schemes whose modulation orders are 8.

(5) The first modulation coding scheme set includes four modulation coding schemes whose modulation orders are 10.

(6) Coding rates corresponding to modulation coding schemes whose modulation orders are 10 in the first modulation coding scheme set are respectively 806/1024, 853/1024, 900/1024, and 948/1024.

Table 1-2 shows another possible example of an MCS index table corresponding to the first modulation coding scheme set.

TABLE 1-2

| MCS index IMCS | Modulation order Qm | Coding rate × [1024] R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 754 | 5.8906 |
| 22 | 8 | 841 | 6.5703 |
| 23 | 8 | 916.5 | 7.1602 |
| 24 | 10 | 805 | 7.8594 |
| 25 | 10 | 876 | 8.5586 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 1-3

| MCS index IMCS | Modulation order Qm | Coding rate × [1024] R × [1024] | Spectral efficiency |
|---|---|---|---|
| 0 | 2 | 120 | 0.2344 |
| 1 | 2 | 308 | 0.6016 |
| 2 | 2 | 602 | 1.1758 |
| 3 | 4 | 434 | 1.6953 |
| 4 | 4 | 553 | 2.1602 |
| 5 | 4 | 658 | 2.5703 |
| 6 | 6 | 517 | 3.0293 |
| 7 | 6 | 616 | 3.6094 |
| 8 | 6 | 719 | 4.2129 |
| 9 | 6 | 822 | 4.8164 |
| 10 | 6 | 873 | 5.1152 |
| 11 | 8 | 682.5 | 5.3320 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 8 | 948 | 7.4063 |
| 19 | 10 | 782 | 7.6377 |
| 20 | 10 | 806 | 7.8691 |
| 21 | 10 | 829 | 8.1005 |
| 22 | 10 | 853 | 8.3319 |
| 23 | 10 | 877 | 8.5633 |
| 24 | 10 | 900 | 8.7947 |
| 25 | 10 | 924 | 9.0261 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

In Table 1-2, each of MCS index values 0-26 corresponds to a modulation coding scheme. Since each of MCS index values 27-31 represents only a modulation order and corresponds to no coding rate, the first modulation coding scheme set shown in Table 1-2 includes 27 modulation coding schemes corresponding to the MCS index values 0-26. Based on Table 1-2, the first modulation coding scheme set has one or more of the following features.

(1) The first modulation coding scheme set includes five modulation coding schemes whose modulation orders are 2.

(2) The first modulation coding scheme set includes six modulation coding schemes whose modulation orders are 4.

(3) The first modulation coding scheme set includes nine modulation coding schemes whose modulation orders are 6.

(4) The first modulation coding scheme set includes four modulation coding schemes whose modulation orders are 8.

(5) The first modulation coding scheme set includes three modulation coding schemes whose modulation orders are 10.

(6) Coding rates corresponding to modulation coding schemes whose modulation orders are 10 in the first modulation coding scheme set are respectively 806/1024, 876/1024, and 948/1024.

Table 1-3 shows another possible example of an MCS index table corresponding to the first modulation coding scheme set.

In Table 1-3, each of MCS index values 0-26 corresponds to a modulation coding scheme. Since each of MCS index values 27-31 represents only a modulation order and corresponds to no coding rate, the first modulation coding scheme set shown in Table 1-3 includes 27 modulation coding schemes corresponding to the MCS index values 0-26. Based on Table 1-3, the first modulation coding scheme set has one or more of the following features.

(1) The first modulation coding scheme set includes three modulation coding schemes whose modulation orders are 2.

(2) The first modulation coding scheme set includes three modulation coding schemes whose modulation orders are 4.

(3) The first modulation coding scheme set includes five modulation coding schemes whose modulation orders are 6.

(4) The first modulation coding scheme set includes eight modulation coding schemes whose modulation orders are 8.

(5) The first modulation coding scheme set includes eight modulation coding schemes whose modulation orders are 10.

(6) Coding rates corresponding to modulation coding schemes whose modulation orders are 10 in the first modulation coding scheme set are respectively 782/1024, 806/1024, 829/1024, 853/1024, 877/1024, 900/1024, 924/1024, and 948/1024.

Table 1-4 shows another possible example of an MCS index table corresponding to the first modulation coding scheme set.

TABLE 1-4

| MCS index IMCS | Modulation order Qm | Coding rate × [1024] R × [1024] | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 567 | 3.3223 |
| 8 | 6 | 666 | 3.9023 |
| 9 | 6 | 719 | 4.2129 |
| 10 | 6 | 772 | 4.5234 |
| 11 | 6 | 822 | 4.8164 |
| 12 | 6 | 873 | 5.1152 |
| 13 | 8 | 682.5 | 5.3320 |
| 14 | 8 | 711 | 5.5547 |
| 15 | 8 | 754 | 5.8906 |
| 16 | 8 | 797 | 6.2266 |
| 17 | 8 | 841 | 6.5703 |
| 18 | 8 | 885 | 6.9141 |
| 19 | 8 | 916.5 | 7.1602 |
| 20 | 8 | 948 | 7.4063 |
| 21 | 10 | 790 | 7.7149 |
| 22 | 10 | 822 | 8.0235 |
| 23 | 10 | 853 | 8.3321 |
| 24 | 10 | 885 | 8.6407 |
| 25 | 10 | 916 | 8.9493 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

In Table 1-4, each of MCS index values 0-26 corresponds to a modulation coding scheme. Since each of MCS index values 27-31 represents only a modulation order and corresponds to no coding rate, the first modulation coding scheme set shown in Table 1-4 includes 27 modulation coding schemes corresponding to the MCS index values 0-26. Based on Table 1-4, the first modulation coding scheme set has one or more of the following features.

(1) The first modulation coding scheme set includes three modulation coding schemes whose modulation orders are 2.

(2) The first modulation coding scheme set includes three modulation coding schemes whose modulation orders are 4.

(3) The first modulation coding scheme set includes seven modulation coding schemes whose modulation orders are 6.

(4) The first modulation coding scheme set includes eight modulation coding schemes whose modulation orders are 8.

(5) The first modulation coding scheme set includes six modulation coding schemes whose modulation orders are 10.

(6) Coding rates corresponding to modulation coding schemes whose modulation orders are 10 in the first modulation coding scheme set are respectively 790/1024, 822/1024, 853/1024, 885/1024, 916/1024, and 948/1024.

The quantity of modulation coding schemes included in the first modulation coding scheme set and the quantity of modulation coding schemes whose modulation orders are 10 in the first modulation coding scheme set that are reflected in the foregoing tables are merely examples. The MCS index table corresponding to the first modulation coding scheme set provided in this application may be in a plurality of forms, which are not listed one by one herein.

Currently, in the NR system, a maximum modulation order corresponding to an MCS is 8. For some terminal devices with good channel quality, for example, terminal devices located in a network central area, communication efficiency of the terminal devices is limited by a modulation order of an MCS, and consequently, communication at a higher rate cannot be implemented. In view of this, the technical solutions in embodiments of this application are provided. In embodiments of this application, a quantity of modulation coding schemes whose modulation orders are 10 is increased, so that the terminal can implement communication at a higher rate when channel quality is good.

4. Channel Quality Information (Channel Quality Information, CQI)

The NR system supports the link adaptation technology. To be specific, a terminal measures channel quality between the terminal and a base station, and feeds back channel quality information (Channel Quality Information, CQI) to the base station, so that the base station can obtain the channel quality between the base station and the terminal, and the base station can more accurately select an MCS for sending a downlink signal.

The terminal device may feed back the CQI to the network device by sending a CQI index to the network device, where the CQI index may be determined from a CQI index table. In the CQI index table, each CQI index corresponds to one modulation coding scheme, and each modulation coding scheme corresponds to a combination of a modulation scheme and a coding rate.

Further, an embodiment of the present invention provides a new modulation coding scheme set, which is referred to as a second modulation coding scheme set in this embodiment. The second modulation coding scheme set is used for the terminal device to feed back CQI, and correspondingly, the second modulation coding scheme set is used for the network device to determine the CQI.

The second modulation coding scheme set provided in this embodiment includes 1024QAM. Each modulation coding scheme corresponds to a combination of a modulation order and a coding rate. Further, each modulation coding scheme may further include one efficiency. In the CQI index table, modulation coding schemes represented by different index values may correspond to different modulation schemes, or may be in a reserved state without any indication of a modulation order. For example, some index values indicate a modulation coding scheme whose modulation order is 2, that is, a modulation scheme of QPSK; some index values indicate a modulation coding scheme whose modulation order is 4, that is, a modulation scheme of 16QAM; some index values indicate a modulation coding scheme whose modulation order is 6, that is, a modulation scheme of 64QAM; some index values indicate a modulation coding scheme whose modulation order is 8, that is, a modulation scheme of 256QAM; and some index values indicate a modulation coding scheme whose modulation order is 10, that is, a modulation scheme of 1024QAM.

In a first optional manner, a quantity of modulation coding schemes whose modulation orders are 10 in the second modulation coding scheme set is not less than a quarter of a total quantity of all modulation coding schemes in the first modulation coding scheme set.

In a second optional manner, a quantity of modulation coding schemes whose modulation orders are 10 in the second modulation coding scheme set is not less than a quantity of modulation coding schemes whose modulation orders are 8 in the first modulation coding scheme set.

In a third optional manner, a sum of a quantity of modulation coding schemes whose modulation orders are 10 and a quantity of modulation coding schemes whose modulation orders are 8 in the second modulation coding scheme set is not less than a half of a total quantity of all modulation coding schemes in the second modulation coding scheme set.

It should be noted that the quantity of modulation coding schemes whose modulation orders are 10 may also meet two or more of the foregoing optional manners. For example, for the second modulation coding scheme set, the quantity of modulation coding schemes whose modulation orders are 10 is not less than a quarter of the total quantity of all modulation coding schemes, and the quantity of modulation coding schemes whose modulation orders are 10 is not less than the quantity of modulation coding schemes whose modulation orders are 8. In another example, for the second modulation coding scheme set, the quantity of modulation coding schemes whose modulation orders are 10 is not less than the quantity of modulation coding schemes whose modulation orders are 8, and the sum of the quantity of modulation coding schemes whose modulation orders are 10 and the quantity of modulation coding schemes whose modulation orders are 8 is not less than a half of the total quantity of all modulation coding schemes in the first modulation coding scheme set. In another example, for the second modulation coding scheme set, the quantity of modulation coding schemes whose modulation orders are 10 is not less than a quarter of the total quantity of all modulation coding schemes, the quantity of modulation coding schemes whose modulation orders are 10 is not less than the quantity of modulation coding schemes whose modulation orders are 8 in the first modulation coding scheme set, and the sum of the quantity of modulation coding schemes whose modulation orders are 10 and the quantity of modulation coding schemes whose modulation orders are 8 is not less than a half of the total quantity of all modulation coding schemes in the first modulation coding scheme set.

Further, specifically, the second modulation coding scheme set includes at least one modulation coding scheme whose modulation order is 10. Optionally, a quantity of the at least one modulation coding scheme whose modulation order is 10 may be 4 or 2. Further, optionally, when the quantity of the at least one modulation coding scheme whose modulation order is 10 is 4, coding rates corresponding to the four modulation coding schemes whose modulation orders are 10 may respectively be 806/1024, 853/1024, 900/1024, and 948/1024; or when the quantity of the at least one modulation coding scheme whose modulation order is 10 is 2, coding rates corresponding to the two modulation coding schemes whose modulation orders are 10 may respectively be 853/1024 and 948/1024.

Embodiments of the present invention further provide the following several examples of CQI index tables including 1024QAM. In an actual system, one or more examples of CQI index tables may be used, or some items of a CQI index table may be used, or a combination of some items of at least two CQI index tables may be used.

Table 2-1 shows a possible example of a CQI index table corresponding to the second modulation coding scheme set.

TABLE 2-1

| CQI index | Modulation scheme | Coding rate × 1024 | Efficiency |
|---|---|---|---|
| 0 | | Out of range | |
| 1 | QPSK | 78 | 0.1523 |
| 2 | QPSK | 193 | 0.3770 |
| 3 | 16QAM | 378 | 1.4766 |
| 4 | 16QAM | 616 | 2.4063 |
| 5 | 64QAM | 567 | 3.3223 |
| 6 | 64QAM | 772 | 4.5234 |
| 7 | 64QAM | 873 | 5.1152 |
| 8 | 256QAM | 711 | 5.5547 |
| 9 | 256QAM | 797 | 6.2266 |
| 10 | 256QAM | 885 | 6.9141 |
| 11 | 256QAM | 948 | 7.4063 |
| 12 | 1024QAM | 806 | 7.8692 |
| 13 | 1024QAM | 853 | 8.3321 |
| 14 | 1024QAM | 900 | 8.7949 |
| 15 | 1024QAM | 948 | 9.2578 |

In Table 2-1, each CQI index represents a modulation coding scheme. Based on Table 2-1, the second modulation coding scheme set may have one or more of the following features.

(1) The second modulation coding scheme set includes two modulation coding schemes whose modulation orders are 2.

(2) The second modulation coding scheme set includes two modulation coding schemes whose modulation orders are 4.

(3) The second modulation coding scheme set includes three modulation coding schemes whose modulation orders are 6.

(4) The second modulation coding scheme set includes four modulation coding schemes whose modulation orders are 8.

(5) The second modulation coding scheme set includes four modulation coding schemes whose modulation orders are 10.

(6) Coding rates corresponding to modulation coding schemes whose modulation orders are 10 in the second modulation coding scheme set are respectively 806/1024, 853/1024, 900/1024, and 948/1024.

Table 2-2 shows another possible example of a CQI index table corresponding to the second modulation coding scheme set.

TABLE 2-2

| CQI index | Modulation scheme | Coding rate × 1024 | Efficiency |
|---|---|---|---|
| 0 | | Out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 797 | 6.2266 |
| 13 | 256QAM | 948 | 7.4063 |
| 14 | 1024QAM | 853 | 8.3321 |
| 15 | 1024QAM | 948 | 9.2578 |

In Table 2-2, each CQI index represents a modulation coding scheme. Based on Table 2-2, the second modulation coding scheme set may have one or more of the following features.

(1) The second modulation coding scheme set includes three modulation coding schemes whose modulation orders are 2.

(2) The second modulation coding scheme set includes three modulation coding schemes whose modulation orders are 4.

(3) The second modulation coding scheme set includes five modulation coding schemes whose modulation orders are 6.

(4) The second modulation coding scheme set includes two modulation coding schemes whose modulation orders are 8.

(5) The second modulation coding scheme set includes two modulation coding schemes whose modulation orders are 10.

(6) Coding rates corresponding to modulation coding schemes whose modulation orders are 10 in the second modulation coding scheme set are respectively 853/1024 and 948/1024.

Table 2-3 shows another possible example of a CQI index table corresponding to the second modulation coding scheme set.

TABLE 2-3

| CQI index | Modulation scheme | Coding rate × 1024 | Efficiency |
|-----------|-------------------|--------------------|-----------|
| 0 | | Out of range | |
| 1 | QPSK | 78 | 0.1523 |
| 2 | QPSK | 449 | 0.8770 |
| 3 | 16QAM | 490 | 1.9141 |
| 4 | 64QAM | 466 | 2.7305 |
| 5 | 64QAM | 666 | 3.9023 |
| 6 | 64QAM | 772 | 4.5234 |
| 7 | 64QAM | 873 | 5.1152 |
| 8 | 256QAM | 711 | 5.5547 |
| 9 | 256QAM | 797 | 6.2266 |
| 10 | 256QAM | 885 | 6.9141 |
| 11 | 256QAM | 948 | 7.4063 |
| 12 | 1024QAM | 790 | 7.7149 |
| 13 | 1024QAM | 822 | 8.0235 |
| 14 | 1024QAM | 885 | 8.6407 |
| 15 | 1024QAM | 948 | 9.2578 |

In Table 2-3, each CQI index represents a modulation coding scheme. Based on Table 2-3, the second modulation coding scheme set may have one or more of the following features.

(1) The second modulation coding scheme set includes two modulation coding schemes whose modulation orders are 2.

(2) The second modulation coding scheme set includes one modulation coding scheme whose modulation order is 4.

(3) The second modulation coding scheme set includes four modulation coding schemes whose modulation orders are 6.

(4) The second modulation coding scheme set includes four modulation coding schemes whose modulation orders are 8.

(5) The second modulation coding scheme set includes four modulation coding schemes whose modulation orders are 10.

(6) Coding rates corresponding to modulation coding schemes whose modulation orders are 10 in the second modulation coding scheme set are respectively 790/1024, 822/1024, 885/1024, and 948/1024.

The second modulation coding scheme set and a quantity of modulation coding schemes whose modulation schemes are 1024QAM that are reflected in the foregoing tables are merely examples. The CQI index table corresponding to the second modulation coding scheme set provided in this application may have a plurality of forms, which are not listed one by one herein.

It should be noted that, although embodiments of the present invention provide an improved MCS index table and an improved CQI index table, in actual use, only one of the MCS index table and the CQI index table in embodiments of the present invention may be used, and the other one may be used in a same technology as that in the current technology. For example, only the MCS index table provided in embodiments of the present invention may be used, or only the CQI index table provided in embodiments of the present invention may be used. Certainly, both the MCS index table and the CQI index table may be used in the manner provided in embodiments of the present invention.

Figure 2:
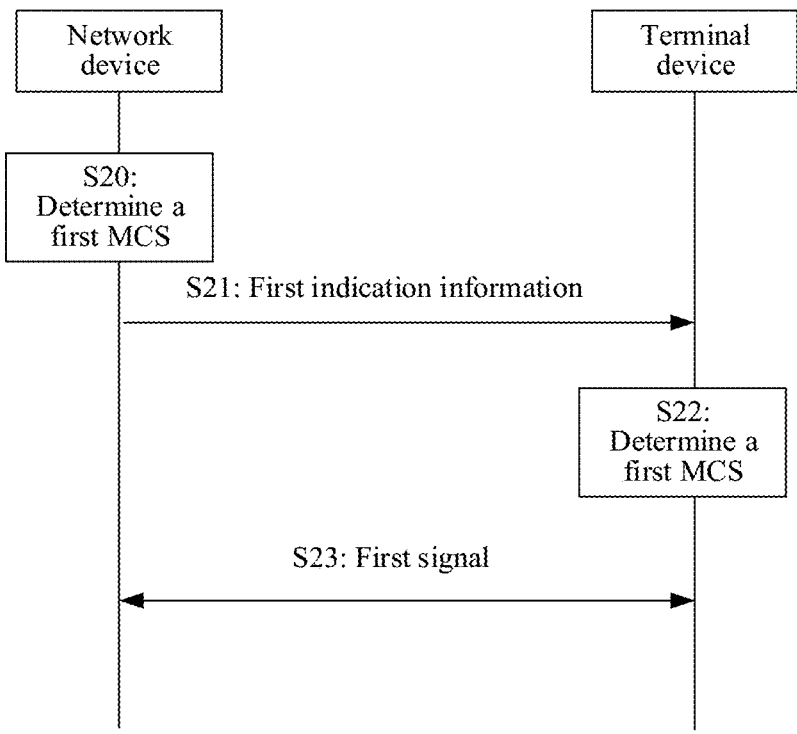
FIG. 2 is a schematic flowchart of a communication method according to this application.

An embodiment of this application provides a communication method, to improve a communication rate of a terminal device in a good channel state including a terminal device in a network central area. FIG. 2 is a flowchart of the method. In the following description, an example in which the method is applied to the schematic diagram of the network architecture shown in FIG. 1 is used.

For ease of description, an example in which the method is performed by the network device and the terminal device is used below. For example, an embodiment of this application is applied to the network architecture shown in FIG. 1. Therefore, a network device described below is, for example, an access network device in the network architecture shown in FIG. 1, and a terminal device described below may be a terminal device in the network architecture shown in FIG. 1.

S20: The network device determines a first modulation coding scheme MCS in a first modulation coding scheme set.

In this embodiment, the network device may determine the first MCS based on a preset state or CQI reported by the terminal device. Certainly, the network device may also randomly determine the first MCS, or determine the first MCS in another manner. A specific implementation is not limited in embodiments of the present invention.

S21: The network device sends first indication information to the terminal device, and correspondingly, the terminal device receives the first indication information from the network device. The first indication information indicates a first modulation coding scheme MCS. The first modulation coding scheme includes a first modulation order and a first coding rate, the first modulation coding scheme is a modulation coding scheme in the first modulation coding scheme set, and the first modulation coding scheme set includes at least one modulation coding scheme whose modulation order is 10.

To be specific, the first modulation coding scheme is a modulation coding scheme in the first modulation coding scheme set, and each modulation coding scheme in the first modulation coding scheme set includes a modulation order and a coding rate.

In addition to the at least one modulation coding scheme whose modulation order is 10, the first modulation coding scheme set may further include one or more of modulation coding schemes whose modulation orders are 2, 4, 6, 8, or the like. Modulation schemes corresponding to modulation orders of 2, 4, 6, 8, and 10 are QPSK, 16QAM, 64QAM, 256QAM, and 1024QAM, respectively.

Optionally, the first modulation coding scheme set may be a predefined coding scheme set, or may be indicated by indication information sent by the network device. For example, when the network device communicates with the terminal device, there are a plurality of available modulation coding scheme sets. In this case, the network device may indicate, through higher layer signaling, the terminal device to determine the first modulation coding scheme from the first modulation coding scheme set.

The first modulation coding scheme set in this step may be represented in the manner provided in the foregoing embodiments. Details are not described herein again. Further, the first modulation coding scheme set is an MCS index table. For example, one of Table 1-1 to Table 1-4 may be used. Certainly, another MCS index table that meets the rule in embodiments of the present invention may also be used.

S22: The terminal device determines, from the first modulation coding scheme set, a first modulation coding scheme corresponding to the first indication information.

To be specific, after receiving the first indication information, the terminal device determines, based on the first indication information, the first modulation coding scheme corresponding to the first indication information from the first modulation coding scheme set.

Optionally, the first indication information may be carried in downlink control information (Downlink Control Information, DCI), or the first indication information may be carried in radio resource control (Radio Resource Control, RRC) signaling, or the first indication information may further be carried in a Media Access Control control element (Media Access Control control element, MAC CE). In addition, optionally, the first indication information may further indicate a resource of a physical downlink shared channel (Physical Downlink Shared Channel, PDSCH) or a physical uplink shared channel (Physical Uplink Shared Channel, PUSCH).

S23: The terminal device processes a received first signal based on the first modulation coding scheme, or the terminal device sends a first signal based on the first modulation coding scheme. Correspondingly, the network device sends the first signal to the terminal device based on the first modulation coding scheme, or the network device processes the received first signal based on the first modulation coding scheme.

After the terminal device determines the first modulation coding scheme from the first modulation coding scheme set, the terminal device may process, based on the first modulation coding scheme, the first signal sent by the network device. In this case, optionally, the first signal may be a physical downlink shared channel PUSCH. Alternatively, the terminal device may send the first signal to the network device based on the first modulation coding scheme. In this case, optionally, the first signal may be a physical uplink shared channel PUSCH.

For example, the first signal is a PDSCH, and a modulation order of the first modulation coding scheme indicated by the first indication information is 10. After the terminal device receives the first indication information and determines the first modulation coding scheme, the terminal device receives the first signal, and decodes the first signal by using a scheme whose modulation order is 10.

For example, the first signal is a PUSCH, and a modulation order of the first modulation coding scheme indicated by the first indication information is 10. After the terminal device receives the first indication information and determines the first modulation coding scheme, the terminal device modulates and codes the first signal by using a scheme whose modulation order is 10, and sends the first signal.

Figure 3:
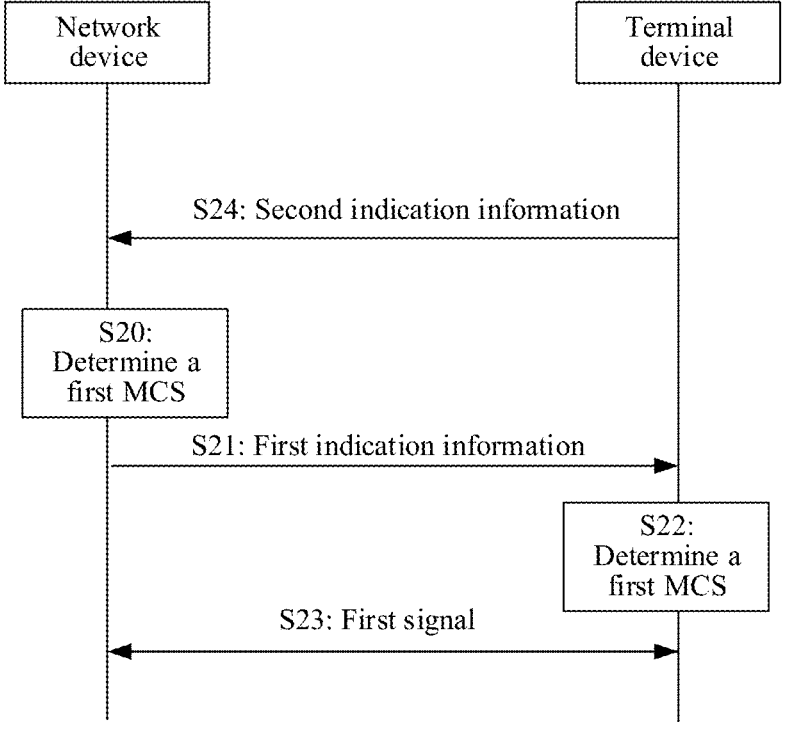
FIG. 3 is another schematic flowchart of a communication method according to this application.

In an embodiment, referring to FIG. 3, before step S20, the communication method further includes the following step.

S24: The terminal device sends second indication information to the network device, where the second indication information indicates a first CQI index, the first CQI index corresponds to a second modulation coding scheme, the second modulation coding scheme is a modulation coding scheme in a second modulation coding scheme set, the second modulation coding scheme includes a second modulation order and a second coding rate, and the second modulation coding scheme set includes at least one modulation coding scheme whose modulation order is 10.

Specifically, channel quality information corresponding to the first CQI index may be channel quality information based on which the network device determines the first MCS in step S20. The second modulation coding scheme is a modulation coding scheme in the second modulation coding scheme set, and each modulation coding scheme in the second modulation coding scheme set includes a modulation order and a coding rate. In addition to the at least one modulation coding scheme whose modulation order is 10, the second modulation coding scheme set may further include modulation coding schemes whose modulation orders are 2, 4, 6, 8, and the like. Modulation schemes corresponding to modulation orders of 2, 4, 6, 8, and 10 are QPSK, 16QAM, 64QAM, 256QAM, and 1024QAM, respectively.

Optionally, a quantity of modulation coding schemes whose modulation orders are 10 included in the second modulation coding scheme set is equal to a quantity of modulation coding schemes whose modulation orders are 10 included in the first modulation coding scheme set. Further, optionally, coding rates of the modulation coding schemes whose modulation orders are 10 included in the second modulation coding scheme set are also equal to coding rates of the modulation coding schemes whose modulation orders are 10 included in the first modulation coding scheme set.

For example, both the quantity of modulation coding schemes whose modulation orders are 10 included in the second modulation coding scheme set and the quantity of modulation coding schemes whose modulation orders are 10 included in the first modulation coding scheme set are 8, and coding rates corresponding to the eight modulation coding schemes whose modulation orders are 10 are 782/1024, 806/1024, 829/1024, 853/1024, 877/1024, 900/1024, 924/1024, and 948/1024.

Figure 4:
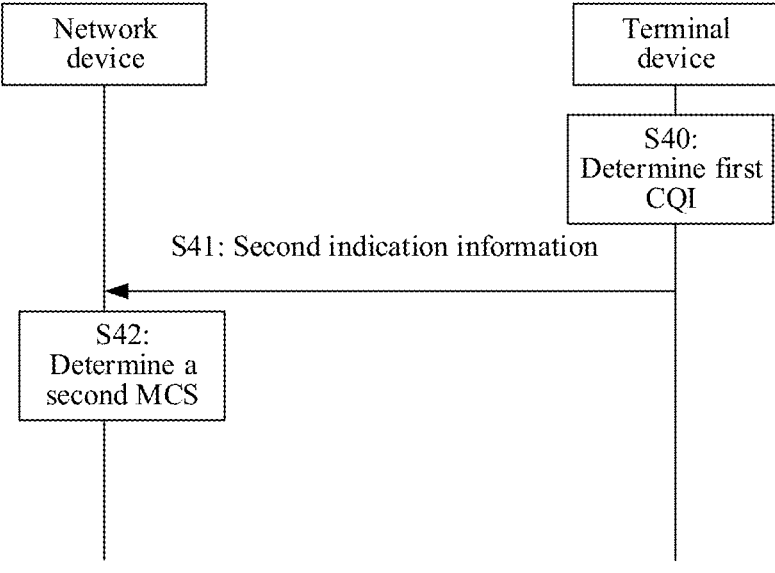
FIG. 4 is another schematic flowchart of a communication method according to this application.

Next, this application provides another communication method, to improve a communication rate of a terminal device in a good channel state including a terminal device in a network central area. FIG. 4 is a flowchart of the method. In the following description, an example in which the method is applied to the schematic diagram of the network architecture shown in FIG. 1 is used.

For ease of description, an example in which the method is performed by the network device and the terminal device is used below. An embodiment of this application is applied to the network architecture shown in FIG. 1 as an example. Therefore, a network device described below is, for example, an access network device in the network architecture shown in FIG. 1, and a terminal device described below may be a terminal device in the network architecture shown in FIG. 1.

S40: The terminal device determines first channel quality information CQI.

Specifically, the terminal device determines the first CQI based on estimated channel quality.

S41: The terminal device sends second indication information to the network device, where the second indication information indicates a first CQI index corresponding to the first CQI, the first CQI index corresponds to a second modulation coding scheme, the second modulation coding scheme is one of the second modulation coding scheme set, the second modulation coding scheme includes a second modulation order and a second coding rate, and the second modulation coding scheme set includes at least one modulation coding scheme whose modulation order is 10.

The second modulation coding scheme is a modulation coding scheme in the second modulation coding scheme set. Each modulation coding scheme in the second modulation coding scheme set includes a modulation scheme and a coding rate. In addition to the at least one modulation coding scheme whose modulation order is 10, the second modulation coding scheme set may further include modulation coding schemes whose modulation orders are 2, 4, 6, 8, and the like. Modulation schemes respectively corresponding to modulation orders of 2, 4, 6, 8, and 10 are QPSK, 16QAM, 64QAM, 256QAM, and 1024QAM.

Since each modulation coding scheme corresponds to one modulation order and one coding rate, such a correspondence is usually represented by using a CQI index table. Each modulation coding scheme is represented by using a CQI index value. Each modulation coding scheme corresponds to one CQI index value, and includes a group of a modulation scheme and a coding rate. Optionally, each modulation coding scheme may further include one efficiency. In the CQI index table, modulation coding schemes represented by different index values may correspond to different modulation schemes, or may be used as a reserved state without any indication of a modulation order. For example, some index values indicate a modulation coding scheme whose modulation order is 2, that is, a modulation scheme of QPSK; some index values indicate a modulation coding scheme whose modulation order is 4, that is, a modulation scheme of 16QAM; some index values indicate a modulation coding scheme whose modulation order is 6, that is, a modulation scheme of 64QAM; some index values indicate a modulation coding scheme whose modulation order is 8, that is, a modulation scheme of 256QAM; and some index values indicate a modulation coding scheme whose modulation order is 10, that is, a modulation scheme of 1024QAM.

The second modulation coding scheme set in this step may be represented in the manner provided in the foregoing embodiments. Details are not described herein again. Further, the second modulation coding scheme set is a CQI index table. For example, one of Table 2-1 to Table 2-3 may be used. Certainly, another CQI index table that meets the rule in embodiments of the present invention may also be used.

S42: The network device determines, from the second modulation coding scheme set, a second modulation coding scheme corresponding to the first CQI index.

Specifically, after receiving the second indication information sent by the terminal device, the network device determines the second modulation coding scheme from the second modulation coding scheme set based on the first CQI index indicated by the second indication information. Optionally, the second modulation coding scheme set may be a predefined coding scheme set, or may be indicated by indication information sent by the network device. For example, when the network device communicates with the terminal device, there are a plurality of available modulation coding scheme sets. In this case, the network device may indicate, through higher layer signaling, the terminal device to determine the second modulation coding scheme from the second modulation coding scheme set.

In this embodiment, the methods in FIG. 2 and FIG. 4 may be used in combination, or may be used independently. When the two are used in combination, the embodiment in FIG. 4 may be performed, and then the embodiment corresponding to FIG. 2 may be performed.

Figure 5:
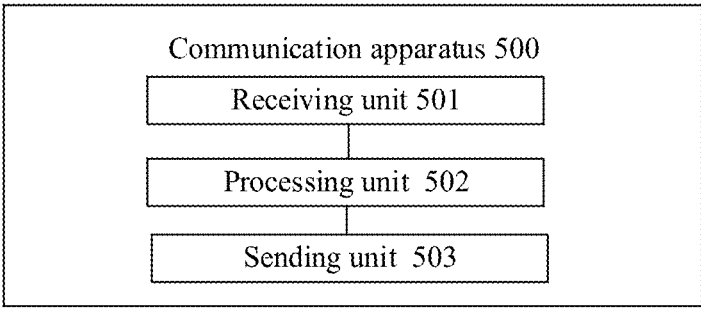
FIG. 5 is a schematic diagram of a structure of a communication apparatus according to this application.

FIG. 5 is a schematic diagram of a structure of a possible communication apparatus according to an embodiment of this application. The communication apparatus 500 includes a receiving unit 501 and a processing unit 502. Optionally, the communication apparatus may further include a sending unit 503.

Specifically, the receiving unit is configured to receive information from another apparatus, for example, receive first indication information from a network device. The processing unit is configured to perform internal processing of the apparatus, for example, determine a first modulation coding scheme. The sending unit is configured to send information to another apparatus, for example, send second indication information.

In an implementation, the communication apparatus 500 is configured to implement functions of the terminal device in the foregoing method embodiment. The communication apparatus 500 may be the terminal device shown in FIG. 1, or may be a module or a unit (for example, a chip) applied to the terminal device.

In an implementation, the communication apparatus 500 is applied to the terminal device in any one of the foregoing steps S20 to S24. The communication apparatus 500 may be a terminal device or a chip configured in the terminal device, and may include a unit configured to perform an operation performed by the terminal device. In addition, the units in the communication apparatus 500 are configured to implement an operation performed by the terminal device in a corresponding method.

In an embodiment, the processing unit 502 is configured to determine a first modulation coding scheme from a first modulation coding scheme set. The receiving unit 501 is configured to receive first indication information, where the first indication information indicates a first modulation coding scheme. The first modulation coding scheme includes a first modulation order and a first coding rate, and the first modulation coding scheme set includes at least one modulation coding scheme whose modulation order is 10.

Optionally, for detailed descriptions of the first modulation coding scheme set and the modulation coding schemes whose modulation orders are 10 in the first modulation coding scheme set, refer to related descriptions in step S21. Details are not described herein again.

Optionally, the communication apparatus 500 may further include a sending unit 503, configured to send second indication information. The second indication information indicates a first CQI index, the first CQI index corresponds to a second modulation coding scheme, the second modulation coding scheme is one of the second modulation coding scheme set, the second modulation coding scheme includes a second modulation order and a second coding rate, and the second modulation coding scheme set includes at least one modulation coding scheme whose modulation order is 10.

Optionally, for detailed descriptions of the second modulation coding scheme set and the modulation coding schemes whose modulation orders are 10 in the second modulation coding scheme set, refer to related descriptions in step S24. Details are not described herein again.

Optionally, a quantity of modulation coding schemes whose modulation orders are 10 in the second modulation coding scheme set is equal to the quantity of modulation coding schemes whose modulation orders are 10 in the first modulation coding scheme set.

Optionally, coding rates corresponding to the modulation coding schemes whose modulation orders are 10 in the second modulation coding scheme set are equal to coding rates corresponding to the modulation coding schemes whose modulation orders are 10 in the first modulation coding scheme set.

In an embodiment, the processing unit 502 is configured to determine first channel quality information CQI, and the sending unit 503 is configured to send second indication information. The second indication information indicates a first CQI index corresponding to the first CQI, the first CQI index corresponds to a second modulation coding scheme, the second modulation coding scheme includes a second modulation order and a second coding rate, the second modulation coding scheme is one of a second modulation coding scheme set, and the second modulation coding scheme set includes at least one modulation coding scheme whose modulation order is 10.

Optionally, for detailed descriptions of the second modulation coding scheme set and the modulation coding schemes whose modulation orders are 10 in the second modulation coding scheme set, refer to related descriptions in step S41. Details are not described herein again.

Figure 6:
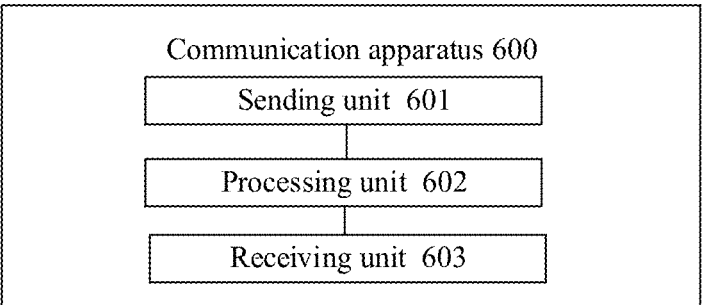
FIG. 6 is another schematic diagram of a structure of a communication apparatus according to this application.

FIG. 6 is a schematic diagram of a structure of a possible communication apparatus according to an embodiment of this application. The communication apparatus 600 includes a sending unit 601 and a processing unit 602. Optionally, the communication apparatus may further include a receiving unit 603.

Specifically, the sending unit is configured to send information to another apparatus, for example, send first indication information. The processing unit is configured to perform internal processing of the apparatus, for example, determine a first modulation coding scheme. The receiving unit is configured to receive information from another apparatus, for example, receive second indication information from a terminal device.

In an implementation, the communication apparatus 600 is configured to implement functions of the network device in the foregoing method embodiment. The communication apparatus 600 may be the network device shown in FIG. 1, or may be a module or a unit (for example, a chip) applied to the network device.

In an implementation, the communication apparatus 600 is applied to the network device in any one of the foregoing steps S20 to S24. The communication apparatus 600 may be a network device or a chip configured in the network device, and may include a unit configured to perform an operation performed by the network device. In addition, the units in the communication apparatus 600 are configured to implement an operation performed by the network device in a corresponding method.

In an embodiment, the processing unit 602 is configured to determine a first modulation coding scheme from a first modulation coding scheme set. The sending unit 601 is configured to send a first modulation coding scheme index to a terminal device, where the first modulation coding scheme index corresponds to a first modulation coding scheme, the first modulation coding scheme includes a first modulation order and a first coding rate, and the first modulation coding scheme set includes at least one modulation coding scheme whose modulation order is 10.

Optionally, for detailed descriptions of the first modulation coding scheme set and the modulation coding schemes whose modulation orders are 10 in the first modulation coding scheme set, refer to related descriptions in step S21. Details are not described herein again.

Optionally, the communication apparatus 600 may further include a receiving unit 603, configured to receive second indication information, where the second indication information indicates the first CQI index, the first CQI index corresponds to a second modulation coding scheme, the second modulation coding scheme is one of the second modulation coding scheme set, the second modulation coding scheme includes a second modulation order and a second coding rate, and the second modulation coding scheme set includes at least one modulation coding scheme whose modulation order is 10.

Optionally, for detailed descriptions of the second modulation coding scheme set and the modulation coding schemes whose modulation orders are 10 in the second modulation coding scheme set, refer to related descriptions in step S24. Details are not described herein again.

Optionally, a quantity of modulation coding schemes whose modulation orders are 10 in the second modulation coding scheme set is equal to the quantity of modulation coding schemes whose modulation orders are 10 in the first modulation coding scheme set.

Optionally, coding rates corresponding to the modulation coding schemes whose modulation orders are 10 in the second modulation coding scheme set are equal to coding rates corresponding to the modulation coding schemes whose modulation orders are 10 in the first modulation coding scheme set.

In an embodiment, the communication apparatus 600 includes a receiving unit 603 and a processing unit 602. The receiving unit 603 receives second indication information. The second indication information indicates a first CQI index corresponding to the first CQI, the first CQI index corresponds to a second modulation coding scheme, the second modulation coding scheme includes a second modulation order and a second coding rate, the second modulation coding scheme is one of a second modulation coding scheme set, and the second modulation coding scheme set includes at least one modulation coding scheme whose modulation order is 10. The processing unit 602 is configured to determine first channel quality information CQI from the second modulation coding scheme set.

Optionally, for detailed descriptions of the second modulation coding scheme set and the modulation coding schemes whose modulation orders are 10 in the second modulation coding scheme set, refer to related descriptions in step S41. Details are not described herein again.

For more detailed descriptions of the receiving unit 501, the receiving unit 603, the sending unit 503, the sending unit 601, the processing unit 502, and the processing unit 602, refer to related descriptions in the foregoing method embodiments. Details are not described herein again. A hardware element of the receiving unit 501 or the receiving unit 603 may be a receiver, a hardware element of the sending unit 503 and the sending unit 601 may be a receiver, or a hardware element of the receiving unit 501, the receiving unit 603, the sending unit 503, or the sending unit 601 may be a transceiver. A hardware element of the processing unit 502 or the processing unit 602 may be a processor.

Figure 7:
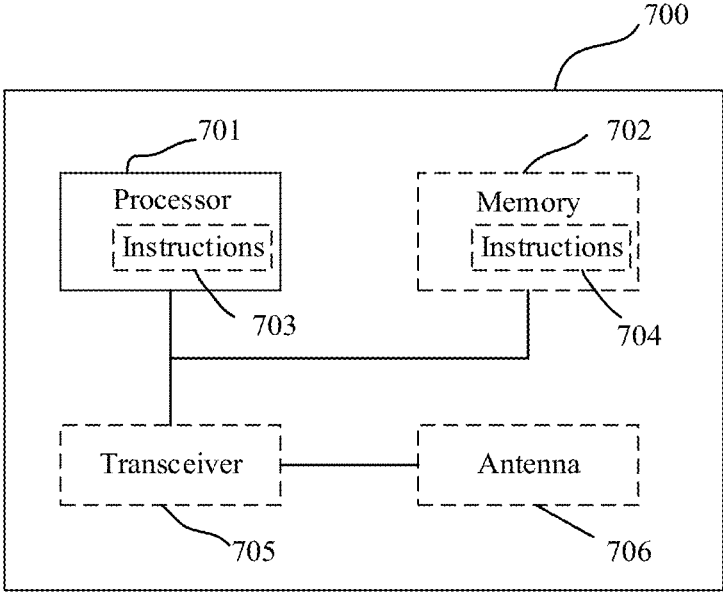
FIG. 7 is still another schematic diagram of a structure of a communication apparatus according to this application.

FIG. 7 is a schematic diagram of a structure of a communication apparatus according to an embodiment of this application. The communication apparatus 700 may be the terminal device in FIG. 1, and is configured to implement the method corresponding to the terminal device in the foregoing method embodiments. Alternatively, the communication apparatus may be the network device in FIG. 1, and is configured to implement the method corresponding to the network device in the foregoing method embodiments. For a specific function, refer to the descriptions in the foregoing method embodiments.

The communication apparatus 700 includes one or more processors 701. The processor 701 may also be referred to as a processing unit, and may implement a specific control function. The processor 701 may be a general-purpose processor, a dedicated processor, or the like. For example, the processor includes a baseband processor, a central processing unit, an application processor, a modem processor, a graphics processor, an image signal processor, a digital signal processor, a video codec processor, a controller, a memory, a neural network processor, and/or the like. The baseband processor may be configured to process a communication protocol and communication data. The central processing unit may be configured to control the communication apparatus 700, execute a software program, and/or process data. Different processors may be independent components, or may be integrated into one or more processors, for example, integrated into one or more application-specific integrated circuits.

Optionally, the communication apparatus 700 includes one or more memories 702, configured to store instructions 704. The instructions may be run on the processor, so that the terminal device 800 performs the method described in the foregoing method embodiments. Optionally, the memory 702 may further store data. The processor and the memory may be independently configured, or may be integrated together.

Optionally, the communication apparatus 700 may include instructions 703 (which may also be referred to as code or a program in some cases), and the instructions 703 may be run on the processor, so that the communication apparatus 700 performs the method described in the foregoing embodiment. The processor 701 may store data.

Optionally, the communication apparatus 700 may further include a transceiver 705 and an antenna 706. The transceiver 705 may be referred to as a transceiver unit, a transceiver machine, a transceiver circuit, a transceiver, an input/output interface, or the like, and is configured to implement a transceiver function of the communication apparatus 700 through the antenna 706.

Optionally, the communication apparatus 700 may further include one or more of the following components: a wireless communication module, an audio module, an external memory interface, an internal memory, a universal serial bus (universal serial bus, USB) interface, a power management module, an antenna, a speaker, a microphone, an input/output module, a sensor module, a motor, a camera, a display screen, or the like. It may be understood that, in some embodiments, the communication apparatus 700 may include more or fewer components, or some components are integrated, or some components are split. These components may be implemented by hardware, software, or a combination of software and hardware.

The processor 701 and the transceiver 705 described in embodiments of this application may be implemented on an integrated circuit (integrated circuit, IC), an analog IC, a radio frequency integrated circuit (radio frequency identification, RFID), a hybrid signal IC, an application-specific integrated circuit (application specific integrated circuit, ASIC), a printed circuit board (printed circuit board, PCB), an electronic device, or the like. The communication apparatus described in this specification may be an independent device (for example, an independent integrated circuit, a mobile phone, or the like), or may be a part of a large device (for example, a module that may be embedded in another device). For details, refer to the foregoing descriptions of the terminal device and the network device. Details are not described herein again.

Embodiments of this application provide a terminal device. The terminal device may be used in the foregoing embodiments. The terminal device includes corresponding means (means), units, and/or circuits for implementing functions of the terminal device in the embodiments shown in FIG. 2, FIG. 3, and/or FIG. 4. For example, the terminal device includes a transceiver module or a transceiver unit, configured to support the terminal device in implementing a transceiver function, and a processing module or a processing unit, configured to support the terminal device in processing a signal.

Figure 8:
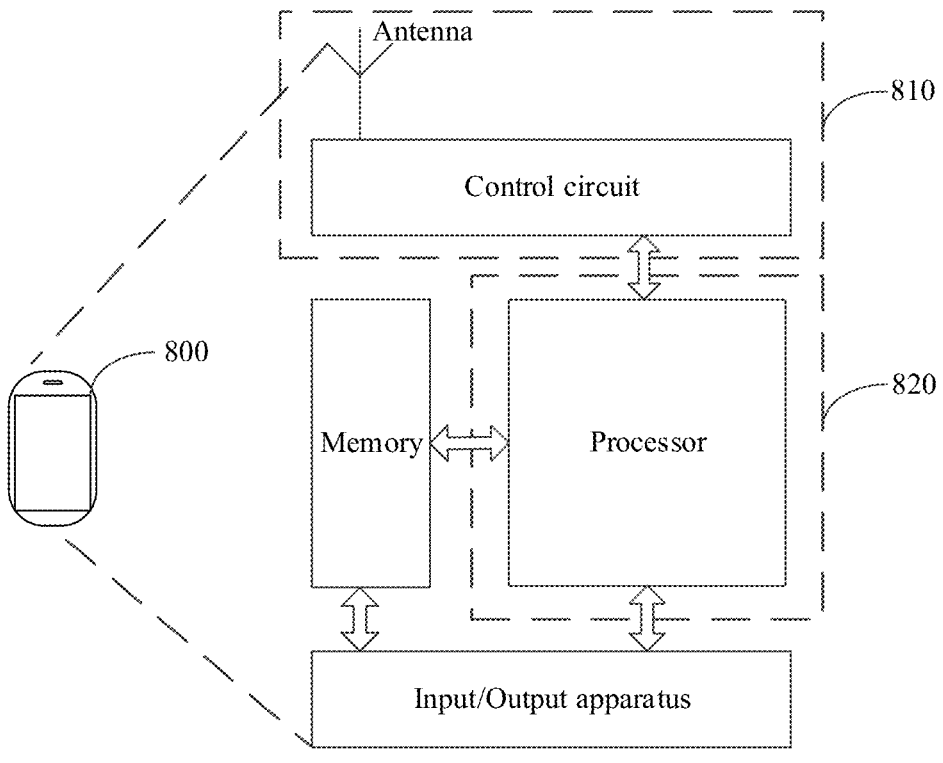
FIG. 8 is a schematic diagram of a structure of a terminal device according to this application.

FIG. 8 is a schematic diagram of a structure of a terminal device according to an embodiment of this application.

The terminal device 800 is applicable to the architecture shown in FIG. 1. For ease of description, FIG. 8 shows only main components of the terminal device 800. As shown in FIG. 8, the terminal device 800 includes a processor, a memory, a control circuit, an antenna, and an input/output apparatus. The processor is mainly configured to: process a communication protocol and communication data, control the entire terminal device 800, execute a software program, and process data of the software program. The memory is mainly configured to store the software program and data. The control circuit is mainly configured to convert a baseband signal and a radio frequency signal and process the radio frequency signal. The antenna is mainly configured to send and receive a radio frequency signal in a form of an electromagnetic wave. The input/output apparatus, such as a touchscreen, a display screen, a microphone, or a keyboard, is mainly configured to receive data entered by a user and output data to the user.

For example, the terminal device 800 is a mobile phone. After the terminal device 800 is powered on, the processor may read a software program in the storage unit, explain and execute an instruction of the software program, and process data of the software program. When needing to send data by using the antenna, the processor outputs a baseband signal to the control circuit after performing baseband processing on the to-be-sent data. After performing radio frequency processing on the baseband signal, the control circuit sends a radio frequency signal in an electromagnetic wave form by using the antenna. When data is sent to the terminal device 800, the control circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and one processor. In some embodiments, the terminal device 800 may include a plurality of processors and memories. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data. The central processing unit is mainly configured to: control the entire terminal device 800, execute a software program, and process data of the software program. The processor in FIG. 8 integrates functions of the baseband processor and the central processing unit. A person skilled in the art may understand that the baseband processor and the central processing unit may alternatively be independent processors, and are interconnected by using a technology such as a bus. The terminal device 800 may include a plurality of baseband processors to adapt to different network standards. The terminal device 800 may include a plurality of central processing units to enhance a processing capability of the terminal device 800. Components of the terminal device 800 may be connected through various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have a transceiver function may be considered as a transceiver unit 810 of the terminal device 800, and the processor that has a processing function may be considered as a processing unit 820 of the terminal device 800. As shown in FIG. 8, the terminal device 800 includes the transceiver unit 810 and the processing unit 820. The transceiver unit may also be referred to as a transceiver machine, a transceiver, a transceiver apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. To be specific, the transceiver unit 810 includes the receiving unit and the sending unit. For example, the receiving unit may also be referred to as a receiver, a receive machine, or a receiving circuit, and the sending unit may also be referred to as a transmitter, a transmit machine, or a transmitting circuit.

Embodiments of this application further provide a network device, and the network device may be used in the foregoing embodiments. The network device includes means (means), units, and/or circuits for implementing functions of the network device in the embodiments shown in FIG. 2, FIG. 3, and/or FIG. 4. For example, the network device includes a transceiver module or a transceiver unit, configured to support the terminal device in implementing a transceiver function, and a processing module or a processing unit, configured to support the network device in processing a signal.

Figure 9:
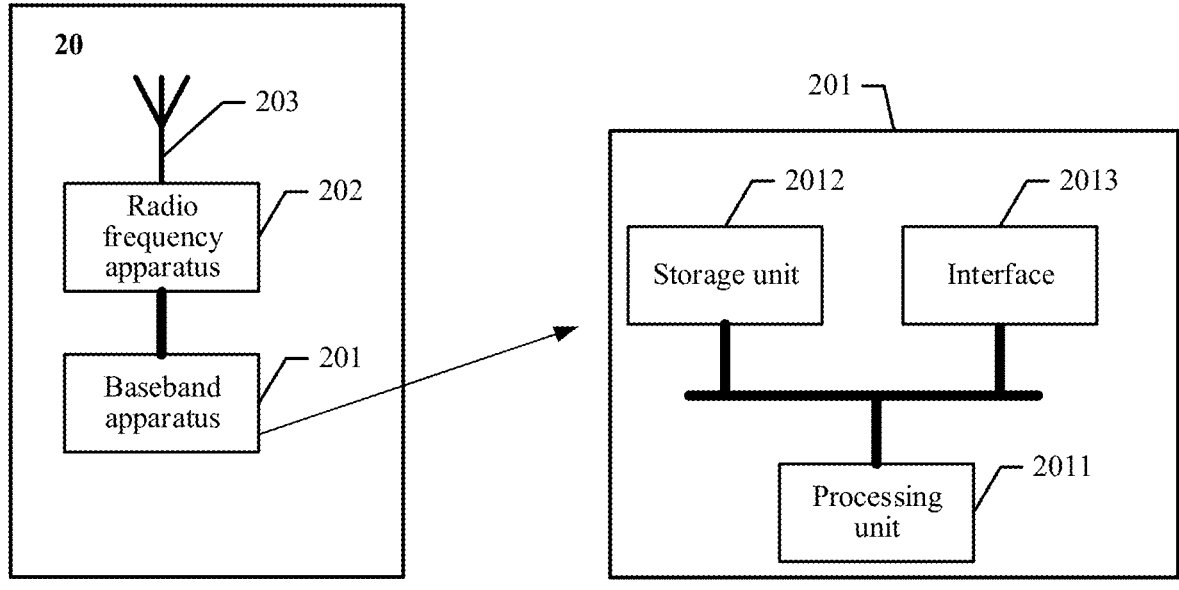
FIG. 9 is a schematic diagram of a structure of a network device according to this application.

FIG. 9 is a schematic diagram of a structure of a network device according to an embodiment of this application. As shown in FIG. 9, the network device 20 is applicable to the architecture shown in FIG. 1. The network device includes a baseband apparatus 201, a radio frequency apparatus 202, and an antenna 203. In an uplink direction, the radio frequency apparatus 202 receives, through the antenna 203, information sent by a terminal device, and sends the information sent by the terminal device to the baseband apparatus 201 for processing. In a downlink direction, the baseband apparatus 201 processes information of the terminal device, and sends the information to the radio frequency apparatus 202. The radio frequency apparatus 202 processes the information of the terminal device, and then sends the processed information to the terminal device through the antenna 201.

The baseband apparatus 201 includes one or more processing units 2011, a storage unit 2012, and an interface 2013. The processing unit 2011 is configured to support the network device in performing functions of the network device in the foregoing method embodiments. The storage unit 2012 is configured to store a software program and/or data. The interface 2013 is configured to exchange information with the radio frequency apparatus 202. The interface includes an interface circuit, configured to input and output information. In an implementation, the processing unit is an integrated circuit, for example, one or more ASICs, one or more DSPs, one or more FPGAs, or a combination of these integrated circuits. These integrated circuits may be integrated together to form a chip. The storage unit 2012 and the processing unit 2011 may be on a same chip, that is, an on-chip storage element. Alternatively, the storage unit 2012 and the processing unit 2011 may be on different chips from the processing unit 2011, that is, an off-chip storage element. The storage unit 2012 may be a memory, or may be a collective name of a plurality of memories or storage elements.

The network device may implement some or all of the steps in the foregoing method embodiments by using one or more processing units to schedule a program. For example, corresponding functions of the network device in FIG. 3 and/or FIG. 7 are implemented. The one or more processing units may support radio access technologies of a same standard, or may support radio access technologies of different standards.

A person of ordinary skill in the art may be aware that, the units and methods in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiments are merely examples. For example, the unit division is merely logical function division, the units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing computer-readable storage medium may be any usable medium accessible by a computer. Through example but not limitative description, the computer-readable medium may include: a random access memory (random access memory, RAM), a read-only memory (read-only memory, ROM), a programmable ROM (programmable ROM, PROM), an erasable PROM (erasable PROM, EPROM), an electrically erasable programmable read only memory (electrically erasable programmable read only memory, EEPROM), a compact disc read-only memory (compact disc read-only memory, CD-ROM), a universal serial bus flash disk (universal serial bus flash disk), a removable hard disk, or an optical disk storage, magnetic disk storage or another magnetic storage device, or any other medium that can be used to carry or store expected program code in a form of an instruction or a data structure and that is accessible by a computer. In addition, through example but not limitative description, many forms of RAMs may be used, for example, a static RAM (static RAM, SRAM), a dynamic RAM (Dynamic RAM, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchlink DRAM (synchlink DRAM, SLDRAM), and a direct rambus RAM (direct rambus RAM, DR RAM).

Terms such as "component", "module", and "system" used in this specification are used for indicating computer-related entities, hardware, firmware, combinations of hardware and software, software, or software being executed. For example, the component may be but is not limited to a process that runs on a processor, a processor, an object, an executable file, an execution thread, a program, or a computer. As shown in the figure, both a computing device and an application that runs on the computing device may be components. One or more components may reside within a process or an execution thread, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments by using any appropriate manner.

It should be understood that, in embodiments of this application, numbers "first", "second", and the like are merely for distinguishing between different objects, for example, to distinguish between different network devices, and do not constitute a limitation on the scope of embodiments of this application. Embodiments of this application are not limited thereto.

It should be further understood that, in this application, both "when" and "if" mean that a network element performs corresponding processing in an objective situation, but do not constitute a limitation on time, do not require that the network element has a determining action during implementation, and do not mean other limitations either.

It should be further understood that, in this application, "at least one" means one or more, and "a plurality of" means two or more.

It should be further understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , or X", in other words, more elements are included in the expression, a case to which the item is applicable may also be obtained according to the foregoing rule.

It may be understood that, in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

receiving first indication information, wherein the first indication information indicates a first modulation coding scheme; and determining, from a first modulation coding scheme set, the first modulation coding scheme indicated by the first indication information, wherein:

the first modulation coding scheme set comprises modulation coding schemes whose modulation orders are respectively 2, 4, 6, 8 and 10, the first modulation coding scheme set comprises 27 modulation coding schemes with indexes of 0~26, the 27 modulation coding schemes consist of:

3 modulation coding schemes whose modulation order is 2, 3 modulation coding schemes whose modulation order is 4, 9 modulation coding schemes whose modulation order is 6, 8 modulation coding schemes whose modulation order is 8, and 4 modulation coding schemes whose modulation order is 10.

2. The method according to claim 1, wherein:

coding rates corresponding to the 3 modulation coding schemes whose modulation order is 2 are respectively 120/1024, 193/1024 and 449/1024;

coding rates corresponding to the 3 modulation coding schemes whose modulation order is 4 are respectively 378/1024, 490/1024 and 616/1024;

coding rates corresponding to the 9 modulation coding schemes whose modulation order is 6 are respectively 466/1024, 517/1024, 567/1024, 616/1024, 666/1024, 719/1024, 772/1024, 822/1024 and 873/1024;

coding rates corresponding to the 8 modulation coding schemes whose modulation order is 8 are respectively 682.5/1024, 711/1024, 754/1024, 797/1024, 841/1024, 885/1024, 916.5/1024 and 948/1024; and coding rates corresponding to 2 of the 4 modulation coding schemes whose modulation orders are 10 comprise 853/1024 and 948/1024.

3. The method according to claim 1, wherein:

the first modulation coding scheme set corresponds to a first modulation coding scheme index table, each modulation coding scheme in the first modulation coding scheme set comprises a spectral efficiency, the first modulation coding scheme set comprises: 3 modulation coding schemes whose modulation order is 2, 3 modulation coding schemes whose modulation order is 4, 9 modulation coding schemes whose modulation order is 6, and 8 modulation coding schemes whose modulation order is 8, as shown in the following part in the first modulation coding scheme index table:

| MCS index IMCS | Modulation order Qm | Coding rate × [1024] R × [1024] | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9144 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 6.9141 |
| 17 | 8 | 754 | 7.1602 |
| 18 | 8 | 797 | 7.4063 |
| 19 | 8 | 841 | 7.6377 |
| 20 | 8 | 885 | 7.8691 |
| 21 | 8 | 916.5 | 8.1005 |
| 22 | 8 | 948 | 8.3319 |

4. The method according to claim 1, wherein the first indication information is carried on downlink control information (DCI).

5. The method according to claim 1, wherein the method further comprises, after determining, from the first modulation coding scheme set, the first modulation coding scheme indicated by the first indication information:

processing a received first signal based on the first modulation coding scheme; or sending a first signal based on the first modulation coding scheme.

6. A communication method, comprising:

determining, from a first modulation coding scheme set, a first modulation coding scheme, wherein:

the first modulation coding scheme set comprises modulation coding schemes whose modulation orders are respectively 2, 4, 6, 8 and 10, the first modulation coding scheme set comprises 27 modulation coding schemes with indexes of 0~26, the 27 modulation coding schemes consist of:

3 modulation coding schemes whose modulation order is 2, 3 modulation coding schemes whose modulation order is 4, 9 modulation coding schemes whose modulation order is 6, 8 modulation coding schemes whose modulation order is 8, and 4 modulation coding schemes whose modulation order is 10;

and sending, first indication information, wherein the first indication information indicates the first modulation coding scheme.

7. The method according to claim 6, wherein:

coding rates corresponding to the 3 modulation coding schemes whose modulation order is 2 are respectively 120/1024, 193/1024 and 449/1024;

coding rates corresponding to the 3 modulation coding schemes whose modulation order is 4 are respectively 378/1024, 490/1024 and 616/1024;

coding rates corresponding to the 9 modulation coding schemes whose modulation order is 6 are respectively 466/1024, 517/1024, 567/1024, 616/1024, 666/1024, 719/1024, 772/1024, 822/1024 and 873/1024;

coding rates corresponding to the 8 modulation coding schemes whose modulation order is 8 are respectively 682.5/1024, 711/1024, 754/1024, 797/1024, 841/1024, 885/1024, 916.5/1024 and 948/1024; and coding rates corresponding to 2 of the 4 modulation coding schemes whose modulation orders are 10 comprise 853/1024 and 948/1024.

8. The method according to claim 6, wherein:

the first modulation coding scheme set corresponds to a first modulation coding scheme index table, each modulation coding scheme in the first modulation coding scheme set comprises a spectral efficiency, the first modulation coding scheme set comprises: 3 modulation coding schemes whose modulation order is 2, 3 modulation coding schemes whose modulation order is 4, 9 modulation coding schemes whose modulation order is 6, and 8 modulation coding schemes whose modulation order is 8, as shown in the following part in the first modulation coding scheme index table:

| MCS index IMCS | Modulation order $Q_m$ | Coding rate × [1024] R × [1024] | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9144 |
| 5 | 4 | 616 | 2.4063 |
| 6 | 6 | 466 | 2.7305 |
| 7 | 6 | 517 | 3.0293 |
| 8 | 6 | 567 | 3.3223 |

-continued

| MCS index IMCS | Modulation order $Q_m$ | Coding rate × [1024] R × [1024] | Spectral efficiency |
|---|---|---|---|
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 6.9141 |
| 17 | 8 | 754 | 7.1602 |
| 18 | 8 | 797 | 7.4063 |
| 19 | 8 | 841 | 7.6377 |
| 20 | 8 | 885 | 7.8691 |
| 21 | 8 | 916.5 | 8.1005 |
| 22 | 8 | 948 | 8.3319 |

9. The method according to claim 6, wherein the first indication information is carried on DCI.

10. The method according to claim 6, wherein the method further comprises, after determining, from the first modulation coding scheme set, the first modulation coding scheme indicated by the first indication information:

processing a received first signal based on the first modulation coding scheme; or sending a first signal based on the first modulation coding scheme.

11. A communications apparatus, comprising one or more processors; and one or more memories, wherein the one or more memories store a computer program, and when executing the computer program stored in the one or more memories, the one or more processors execute operations comprising:

receiving first indication information, wherein the first indication information indicates a first modulation coding scheme; and determining, from a first modulation coding scheme set, the first modulation coding scheme indicated by the first indication information, wherein:

the first modulation coding scheme set comprises modulation coding schemes whose modulation orders are respectively 2, 4, 6, 8 and 10, the first modulation coding scheme set comprises 27 modulation coding schemes with indexes of 0~26, the 27 modulation coding schemes consist of:

3 modulation coding schemes whose modulation order is 2, 3 modulation coding schemes whose modulation order is 4, 9 modulation coding schemes whose modulation order is 6, 8 modulation coding schemes whose modulation order is 8, and 4 modulation coding schemes whose modulation order is 10.

12. The apparatus according to claim 11, wherein:

coding rates corresponding to the 3 modulation coding schemes whose modulation order is 2 are respectively 120/1024, 193/1024 and 449/1024;

coding rates corresponding to the 3 modulation coding schemes whose modulation order is 4 are respectively 378/1024, 490/1024 and 616/1024;

coding rates corresponding to the 9 modulation coding schemes whose modulation order is 6 are respectively 466/1024, 517/1024, 567/1024, 616/1024, 666/1024, 719/1024, 772/1024, 822/1024 and 873/1024;

coding rates corresponding to the 8 modulation coding schemes whose modulation order is 8 are respectively 682.5/1024, 711/1024, 754/1024, 797/1024, 841/1024, 885/1024, 916.5/1024 and 948/1024; and coding rates corresponding to 2 of the 4 modulation coding schemes whose modulation orders are 10 comprise 853/1024 and 948/1024.

13. The apparatus according to claim 11, wherein:

the first modulation coding scheme set corresponds to a first modulation coding scheme index table, each modulation coding scheme in the first modulation coding scheme set comprises a spectral efficiency, the first modulation coding scheme set comprises: 3 modulation coding schemes whose modulation order is 2, 3 modulation coding schemes whose modulation order is 4, 9 modulation coding schemes whose modulation order is 6, and 8 modulation coding schemes whose modulation order is 8, as shown in the following part in the first modulation coding scheme index table:

| MCS index IMCS | Modulation order Qm | Coding rate × [1024] R × [1024] | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9144 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 6.9141 |
| 17 | 8 | 754 | 7.1602 |
| 18 | 8 | 797 | 7.4063 |
| 19 | 8 | 841 | 7.6377 |
| 20 | 8 | 885 | 7.8691 |
| 21 | 8 | 916.5 | 8.1005 |
| 22 | 8 | 948 | 8.3319 |

14. The apparatus according to claim 11, wherein the first indication information is carried on DCI.

15. The apparatus according to claim 11, wherein the operations further comprise, after determining, from the first modulation coding scheme set, the first modulation coding scheme indicated by the first indication information:

processing a received first signal based on the first modulation coding scheme; or sending a first signal based on the first modulation coding scheme.

16. A communication apparatus, comprising one or more processors; and one or more memories, wherein the one or more memories store a computer program, and when executing the computer program stored in the one or more memories, the one or more processors execute operations comprising:

determining, from a first modulation coding scheme set, a first modulation coding scheme, wherein:

the first modulation coding scheme set comprises modulation coding schemes whose modulation orders are respectively 2, 4, 6, 8 and 10, the first modulation coding scheme set comprises 27 modulation coding schemes with indexes of 0~26, the 27 modulation coding schemes consist of:

3 modulation coding schemes whose modulation order is 2, 3 modulation coding schemes whose modulation order is 4, 9 modulation coding schemes whose modulation order is 6, 8 modulation coding schemes whose modulation order is 8, and 4 modulation coding schemes whose modulation order is 10;

and sending, first indication information, wherein the first indication information indicates the first modulation coding scheme.

17. The apparatus according to claim 16, wherein:

coding rates corresponding to the 3 modulation coding schemes whose modulation order is 2 are respectively 120/1024, 193/1024 and 449/1024;

coding rates corresponding to the 3 modulation coding schemes whose modulation order is 4 are respectively 378/1024, 490/1024 and 616/1024;

coding rates corresponding to the 9 modulation coding schemes whose modulation order is 6 are respectively 466/1024, 517/1024, 567/1024, 616/1024, 666/1024, 719/1024, 772/1024, 822/1024 and 873/1024;

coding rates corresponding to the 8 modulation coding schemes whose modulation order is 8 are respectively 682.5/1024, 711/1024, 754/1024, 797/1024, 841/1024, 885/1024, 916.5/1024 and 948/1024; and coding rates corresponding to 2 of the 4 modulation coding schemes whose modulation orders are 10 comprise 853/1024 and 948/1024.

18. The apparatus according to claim 16, wherein:

the first modulation coding scheme set corresponds to a first modulation coding scheme index table, each modulation coding scheme in the first modulation coding scheme set comprises a spectral efficiency, the first modulation coding scheme set comprises: 3 modulation coding schemes whose modulation order is 2, 3 modulation coding schemes whose modulation order is 4, 9 modulation coding schemes whose modulation order is 6, and 8 modulation coding schemes whose modulation order is 8, as shown in the following part in the first modulation coding scheme index table:

| MCS index IMCS | Modulation order Qm | Coding rate × [1024] R × [1024] | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9144 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 6.9141 |
| 17 | 8 | 754 | 7.1602 |
| 18 | 8 | 797 | 7.4063 |

41

-continued

| MCS index IMCS | Modulation order Qm | Coding rate × [1024] R × [1024] | Spectral efficiency |
|---|---|---|---|
| 19 | 8 | 841 | 7.6377 |
| 20 | 8 | 885 | 7.8691 |
| 21 | 8 | 916.5 | 8.1005 |
| 22 | 8 | 948 | 8.3319 |

19. The apparatus according to claim 16, wherein the first indication information is carried on DCI.

20. The apparatus according to claim 19, wherein the operations further comprise, after determining, from the first modulation coding scheme set, the first modulation coding scheme indicated by the first indication information:

processing a received first signal based on the first modulation coding scheme; or sending a first signal based on the first modulation coding scheme.

\* \* \* \* \*